(12) United States Patent
Davis et al.

(10) Patent No.: US 11,113,768 B1
(45) Date of Patent: *Sep. 7, 2021

(54) SYSTEMS AND METHODS FOR ENHANCED SITUATION VISUALIZATION

(71) Applicant: State Farm Mutual Automobile Insurance Company, Bloomington, IL (US)

(72) Inventors: Timothy Joel Davis, Chicago, IL (US); Amy Engelhorn, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,059

(22) Filed: Nov. 18, 2019

Related U.S. Application Data

(63) Continuation of application No. 16/457,026, filed on Jun. 28, 2019, which is a continuation of application No. 15/184,916, filed on Jun. 16, 2016, now Pat. No. 10,529,028.

(60) Provisional application No. 62/185,359, filed on Jun. 26, 2015, provisional application No. 62/194,027, filed on Jul. 17, 2015.

(51) Int. Cl.
  *G06Q 40/08* (2012.01)
  *G06T 19/00* (2011.01)
(52) U.S. Cl.
  CPC .......... *G06Q 40/08* (2013.01); *G06T 19/006* (2013.01)

(58) Field of Classification Search
  CPC ....... G06Q 40/08; G06Q 40/00; G06T 19/006
  See application file for complete search history.

(56) References Cited

U.S. PATENT DOCUMENTS

| | | |
|---|---|---|
| 7,809,587 B2 | 10/2010 | Dorai et al. |
| 8,760,285 B2 | 6/2014 | Billman et al. |
| 8,805,707 B2 | 8/2014 | Schumann, Jr. et al. |
| 9,053,516 B2 | 6/2015 | Stempora |

(Continued)

OTHER PUBLICATIONS

"Google Glass may help firms save $1bn by making employees 'more efficient'" South Asian Media Net Lahore: HT Digital Streams Limited (Nov. 14, 2013). (Year: 2013).*

(Continued)

*Primary Examiner* — Elda G Milef
(74) *Attorney, Agent, or Firm* — Armstrong Teasdale LLP

(57) ABSTRACT

An augmented reality (AR) system for generating and displaying an enhanced situation visualization (ESV) is provided. The AR system may include an ESV computing device, a user computing device operated by a user and a reference database. The user computing device may transmit a reference request message to the ESV device, the reference request message including an image representative of a current view of a user. The ESV computing device may determine a subject of the image, retrieve reference information associated with the subject from the reference database, and determine situation information specific to the subject. The reference and situation information may be displayed on the user computing device to provide an ESV of the subject. The ESV may be used for insurance-related activities, such as handling, adjusting, and/or generating homeowner's insurance claims, and/or for instructional guidance.

17 Claims, 20 Drawing Sheets

(56) References Cited

U.S. PATENT DOCUMENTS

| | | |
|---|---|---|
| 9,082,015 B2 | 7/2015 | Christopulos et al. |
| 9,654,679 B1* | 5/2017 | Veliche .............. H04N 5/23203 |
| 10,032,225 B1* | 7/2018 | Fox ........................ G06Q 40/08 |
| 10,579,749 B1 | 3/2020 | Davis et al. |
| 2002/0055861 A1 | 5/2002 | King et al. |
| 2011/0137685 A1 | 6/2011 | Tracy et al. |
| 2011/0153368 A1 | 6/2011 | Pierre et al. |
| 2011/0213628 A1 | 9/2011 | Peak et al. |
| 2012/0059676 A1 | 3/2012 | King |
| 2012/0065944 A1* | 3/2012 | Nielsen ................ G06Q 10/103 703/1 |
| 2012/0076437 A1 | 3/2012 | King |
| 2012/0253852 A1 | 10/2012 | Pourfallah et al. |
| 2014/0244318 A1 | 8/2014 | Drake et al. |
| 2014/0257862 A1 | 9/2014 | Billman et al. |
| 2014/0257864 A1 | 9/2014 | Billman |
| 2014/0270492 A1 | 9/2014 | Christopulos et al. |
| 2014/0278585 A1* | 9/2014 | Zerbib ................... G06Q 40/08 705/4 |
| 2014/0350970 A1 | 11/2014 | Schumann, Jr. et al. |
| 2015/0046194 A1 | 2/2015 | Waddell et al. |
| 2015/0073834 A1 | 3/2015 | Gurenko et al. |
| 2015/0106133 A1 | 4/2015 | Smith, Jr. |
| 2015/0343947 A1 | 12/2015 | Bernico et al. |
| 2016/0063635 A1 | 3/2016 | Collazo et al. |
| 2016/0093000 A1 | 3/2016 | Pevzner et al. |
| 2016/0171622 A1* | 6/2016 | Perkins .................. H04N 5/232 705/4 |

OTHER PUBLICATIONS

"Vuzix M100 Smart Glasses," Overview, Features, and Specifications, accessed Jun. 23, 2016 at: https:/lwww.vuzix.com/Products/m100-smart-glasses.

"GlassUp," Home and Features, accessed Jun. 23, 2016 at: http://www_glassup.net/en/.

"Meta," Home, accessed Jun. 23, 2016 at: https:/lwww.metavision.com/.

"Optinvent: ORA Data Sheet," accessed Jun. 23, 2016 at http:/fwww_optinventcom/wp-contenl/uploads/2016/06/Flyer-ORA-2-0616.pdf.

"Magic Leap," accessed Jun. 23, 2016 at: hllps://enwikipedia.org/wiki/Magic_Leap.

"Google Glass," accessed Jun. 23, 2016 at: hllps://enwikipedia.org/wiki/Google_Glass.

\* cited by examiner

SYSTEMS AND METHODS FOR ENHANCED SITUATION VISUALIZATION

CROSS-REFERENCE TO RELATED APPLICATIONS

This application is a continuation application of U.S. patent application Ser. No. 16/457,026, filed Jun. 28, 2019, entitled "SYSTEMS AND METHODS FOR ENHANCED SITUATION VISUALIZATION, which is a continuation application of U.S. patent application Ser. No. 15/184,916, filed Jun. 16, 2016, entitled "SYSTEMS AND METHODS FOR ENHANCED SITUATION VISUALIZATION," which claims the benefit of priority to U.S. Provisional Patent Application No. 62/185,359, filed Jun. 26, 2015, entitled "SYSTEMS AND METHODS FOR ENHANCED SITUATION VISUALIZATION," and to U.S. Provisional Patent Application No. 62/194,027, filed Jul. 17, 2015, entitled "SYSTEMS AND METHODS FOR ENHANCED SITUATION VISUALIZATION," and is further related to U.S. patent application Ser. No. 15/184,886, filed Jun. 16, 2016, entitled "SYSTEMS AND METHODS FOR AUGMENTED REALITY FOR DISASTER SIMULATION," the entire contents of which are hereby incorporated by reference in their entirety.

FIELD OF THE INVENTION

The present disclosure relates to augmented reality and, more particularly, to systems and methods for generating and displaying an enhanced situation visualization on a user computing device.

BACKGROUND

There are many locations across the world that are plagued by natural disasters. Very few regions, in fact, are excluded from the risk of disasters such as tornadoes, floods, forest fires, hurricanes, earthquakes, mudslides, or tsunamis. Accordingly, some consumers attempt to defray those risks by purchasing insurance policies for their property, vehicle(s), and valuable items. When disaster strikes, though the property, vehicle, or other item may be damaged or destroyed, these consumers have an avenue to recoup some or all of the monetary value associated with such damage or loss. Unfortunately, in many cases, it may be difficult for a consumer or a representative of an insurance provider to quantify or characterize damage to a property or other object. For example, underwriting documentation regarding the property or object may be old or out-of-date, and/or no longer representative of the value of the property; or an extent of damage or loss may be difficult to visualize and capture without extensive research. There is a need for an efficient and effective method for enhancing a view of a disaster situation such that any damage or loss may be conveniently and accurately quantified.

The concept of augmented reality (AR) refers to a real-time direct or indirect view of a physical, real-world environment with augmented (or supplemented) elements generated by a computer. The AR view is generally presented on a display of a user computing device. The user computing device may use the view from a camera as a base or foundation view, and then augments or supplements the base view with the AR. The benefits of AR have been realized in many industries, including, for example, commerce, in which a user may scan or otherwise view a product and may be presented with additional images of the product; gaming, in which users may experience game play in a real-world environment with virtual supplements; and medicine, in which technology has been developed that maps subcutaneous veins and arteries onto a patient's skin.

BRIEF SUMMARY

The present embodiments may relate to systems and methods for providing enhanced situation visualization. An augmented reality (AR) system for generating and displaying such an enhanced situation visualization (ESV) is provided. The AR system may include an ESV computing device, a user computing device operated by a user, and a reference database. The user computing device may transmit a reference request message to the ESV device, the reference request message including an image representative of a current view of a user. For example, an insurance claims adjuster may be interested in the extent and nature of damage to an insured property to submit an accurate claim for disbursement. In at least one exemplary embodiment, the adjuster (or any other user) may generate and transmit a reference request message (using their user computing device) that includes an image representative of their current view and a subject (e.g., the damaged property) of the current view. The ESV computing device may determine a subject of the image, retrieve reference information associated with the subject from the reference database, and/or determine situation information specific to the subject. The reference information and situation information are displayed to the user as an ESV on a display of the user computing device, for example, overlaid upon the user's current view through the user computing device. The ESV may be used for insurance-related activities, such as handling, adjusting, populating, and/or generating homeowner's insurance claims, and/or for instructional guidance.

In one aspect, an enhanced situation visualization (ESV) computing device may be provided. The ESV computing device may include a memory and at least one processor communicatively coupled to the memory. The at least one processor may be programmed to receive a reference request message from a user computing device. The reference request message may include an image representative of a current view of a user of the user computing device, and the image may include a property in a current state. The at least one processor may also be programmed to determine a first subject of the image. The first subject may be the property. The at least one processor may be further programmed to retrieve, from a reference database, reference information associated with the first subject of the image. The reference information may include a historical image of the property in a prior state. The at least one processor may be programmed to determine, based upon the reference request message and the reference information, situation information specific to a situation of the first subject. The situation information may include at least one difference between the prior state and the current state of the property. The at least one processor may be further programmed to generate a reference response message including the situation information and the reference information, and transmit the reference response message to the user computing device. The reference response message may cause at least one of the situation information and the reference information to be displayed on the user computing device as overlaid upon the current view of the user to provide an enhanced situation visualization of the property. The ESV may be used, for example, for insurance-related activities, such as handling, adjusting, and/or generating homeowner's insurance claims, and/or for instructional guidance. The ESV computing device may include additional, less, or alternate functionality, including that discussed elsewhere herein.

In another aspect, a computer-based method for generating and displaying an enhanced situation visualization (ESV) on a user interface of a user computing device may be provided. The method may include receiving, by an ESV computing device, a reference request message from the user computing device. The reference request message may include an image representative of a current view of a user of the user computing device. The image may include a property in a current state. The method may also include determining a first subject of the image. The first subject may be the property. The method may also include retrieving, from a reference database, reference information associated with the first subject of the image. The reference information may include a historical image of the property in a prior state. The method may further include determining, based upon the reference request message and the reference information, situation information specific to a situation of the first subject. The situation information may include at least one difference between the prior state and the current state of the property. In addition, the method may include generating a reference response message including the situation information and the reference information, and transmitting the reference response message to the user computing device. The reference response message may cause at least one of the situation information and the reference information to be displayed on the user computing device as overlaid upon the current view of the user to provide an enhanced situation visualization of the property. The ESV may be used, for example, for insurance-related activities, such as handling, adjusting, and/or generating homeowner's insurance claims, and/or for instructional guidance. The method may include additional, less, or alternate actions, including those discussed elsewhere herein.

In yet another aspect, at least one non-transitory computer-readable storage media having computer-executable instructions embodied thereon may be provided. The computer-executable instructions, when executed by at least one processor, may cause the processor to receive a reference request message from a user computing device, the reference request message including an image representative of a current view of a user of the user computing device. The image may include a property in a current state. The computer-executable instructions may also cause the processor to determine a first subject of the image. The first subject may be the property. The computer-executable instructions may further cause the processor to retrieve, from a reference database, reference information associated with the first subject of the image. The reference information may include a historical image of the property in a prior state. The computer-executable instructions may also cause the processor to determine, based upon the reference request message and the reference information, situation information specific to a situation of the first subject. The situation information may include at least one difference between the prior state and the current state of the property. The computer-executable instructions may further cause the processor to generate a reference response message including the situation information and the reference information, and transmit the reference response message to the user computing device. The reference response message may cause at least one of the situation information and the reference information to be displayed on the user computing device as overlaid upon the current view of the user to provide an enhanced situation visualization of the property. Additional, less, or alternate instructions may be provided, such as instructions directing the functionality discussed elsewhere herein.

In a further aspect, an enhanced situation visualization (ESV) computing device may be provided. The ESV computing device may include a memory and at least one processor communicatively coupled to the memory. The at least one processor may be programmed to receive a reference request message from a user computing device. The reference request message may include an image representative of a current view of a user of the user computing device, the image including a medication. The at least one processor may also be programmed to determine a first subject of the image, wherein the first subject is the medication. The at least one processor may be further programmed to retrieve, from a reference database, reference information associated with the first subject of the image. The reference information may include a medication schedule associated with the medication and with the user. The at least one processor may also be programmed to determine, based upon the reference request message and the reference information, situation information specific to a situation of the first subject. The situation information may include a status indicator indicating whether the user has complied with the medication schedule and a schedule alert to remind the user to take the medication at a time including in the medication schedule. The at least one processor may be further programmed to generate a reference response message including the situation information and the reference information, and transmit the reference response message to the user computing device. The reference response message may cause at least one of the situation information and the reference information to be displayed on the user computing device as overlaid upon the current view of the user to provide an enhanced situation visualization of the medication. The ESV computing device may include additional, less, or alternate functionality, including that discussed elsewhere herein.

In a further aspect, an enhanced situation visualization (ESV) computing device may be provided. The ESV computing device may include a memory and at least one processor communicatively coupled to the memory. The at least one processor may be programmed to receive a reference request message from a user computing device. The reference request message may include an image representative of a current view of a user of the user computing device and an instructional guidance request. The at least one processor may also be programmed to determine a first subject of the image, and retrieve, from a reference database, reference information associated with the first subject of the image. The reference information may include an instructional guide. The at least one processor may be further programmed to determine, based upon the image and the instructional guide, situation information specific to a situation of the first subject. The situation information may include a status of the first subject and a first instruction based upon the status of the first subject and the instructional guide. The at least one processor may be also programmed to generate a reference response message including the situation information and the reference information, and transmit the reference response message to the user computing device. The reference response message may cause at least one of the situation information and the reference information to be displayed on the user computing device as overlaid upon the current view of the user to provide an enhanced situation visualization of the first subject. The ESV computing device may include additional, less, or alternate functionality, including that discussed elsewhere herein.

In another aspect, an insurance server may be provided. The insurance server may include at least one processor and may be in communication with a database. The at least one processor may be configured to store a claims form, wherein the claims form includes at least one fillable field associated with an insurance claim. The at least one processor may also be configured to receive a reference response message generated at an enhanced situation visualization computing device. The reference response message may identify a property in a current state, and may include reference information associated with the property and situation information associated with the current state of the property. The situation information may include at least one difference between the current state of the property and a prior state of the property. The at least one processor may be further configured to identify an insurance policy associated with the property, and populate the at least one field of the claims form with at least one of the reference information and the situation information. The populated claims form may be used to update and/or adjust the insurance policy associated with the property. The insurance server may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
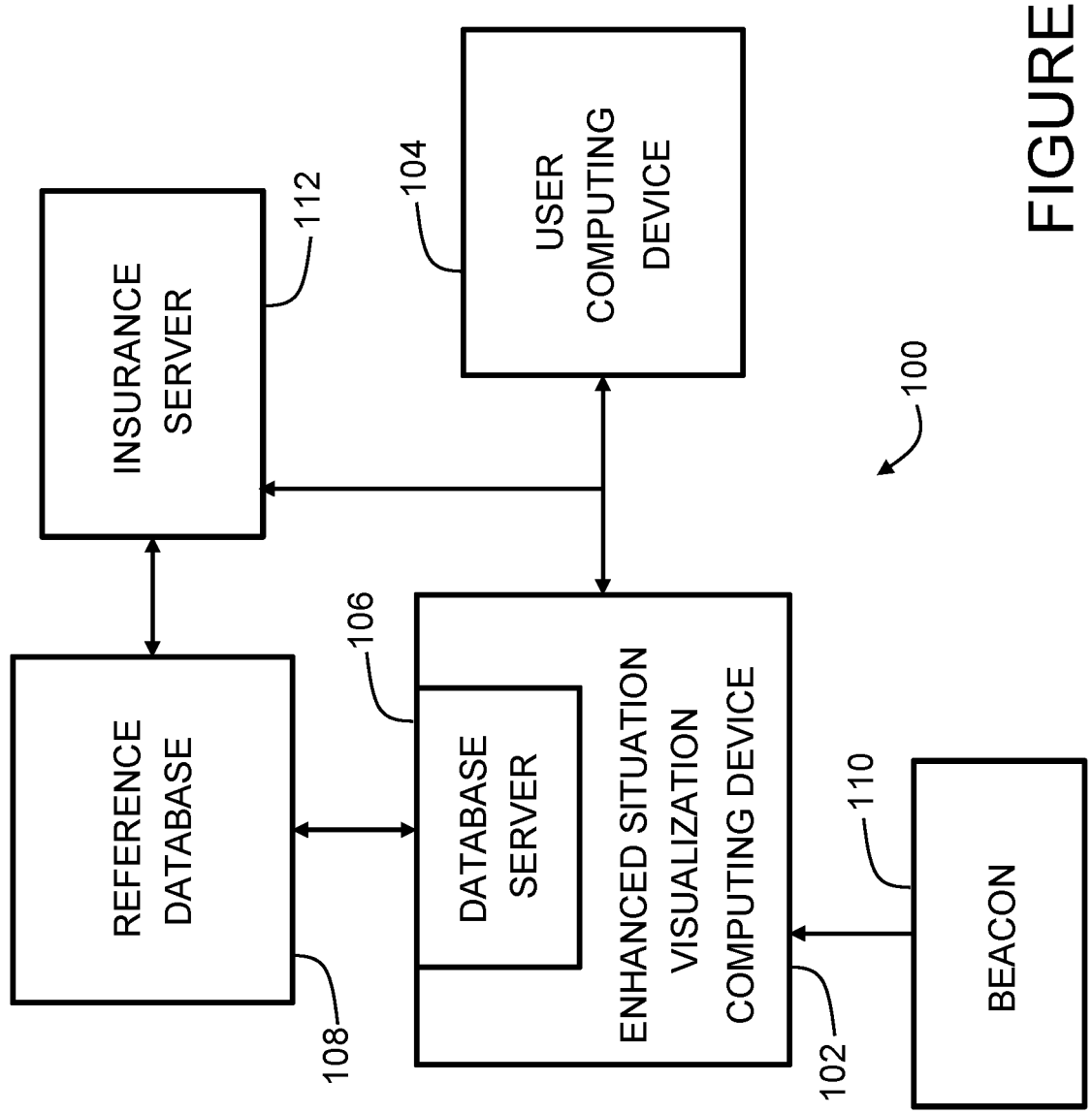
FIG. 1 illustrates a schematic view of an exemplary reality augmentation system for providing enhanced situation visualization.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for enhanced situation visualization. The system described herein includes a reality augmentation computer system having an enhanced situation visualization (ESV) computing device, a reference database, one or more beacons, and/or a user computing device. The ESV computing device may be communicatively coupled to the reference database, which may store a number of historical images and reference information associated with a number of subjects, as will be described more fully herein. The ESV computing device may be communicatively coupled to the user computing device and the one or more beacons via, for example, a wireless network.

In an exemplary embodiment, the ESV computing device may receive a request from the user computing device for information to describe, supplement, or augment a current view of a user through the user computing device. The request (a "reference request message") may include a real-time image of the current view of the user, as well as other additional information, such as device data (associated with the user computing device), user account information, and/or subject identifiers (e.g., a barcode on a subject item). The ESV computing device may determine one or more subjects of the user's current view. Such determination may be made, for example, based upon object recognition, location analysis, user input, processing of any subject identifier(s), or any other analysis. The ESV computing device may then retrieve from the reference database at least one of a historical image and reference information associated with the subject. The ESV computing device may then, based upon the retrieved historical image and/or reference information, determine situation information specific to the situation of the user. The ESV computing device may then generate and transmit a response, including the historical image and/or reference information and the situation information, to the user computing device. The response (a "reference response message") may further include instructions causing the user computing device to display the information transmitted in the reference response message on a display area of the user computing device.

The information may be displayed as overlaid on, beside, or instead of the current view of the user, such that the information is not only generally visible to the user but is visually near the subject with which the information is associated, relative to the display area. In one exemplary embodiment, the information is displayed over a real-time view of the subject from a camera of the user computing device. Accordingly, the ESV computing device may facilitate enhanced visualization of the user's current situation, providing additional information, instruction, and/or guidance that may otherwise be difficult to obtain by and/or communicate to the user.

As described below in more detail, the ESV computing device may be configured to (i) receive a reference request message from a user computing device, the reference request message including an image representative of a current view of a user of the user computing device, the image including a property in a current state; (ii) determine a first subject of the image, wherein the first subject is the property; (iii) retrieve, from a reference database, reference information associated with the first subject of the image, wherein the reference information includes a historical image of the property in a prior state; (iv) determine, based upon the reference request message and the reference information, situation information specific to a situation of the first subject, wherein the situation information includes at least one difference between the prior state and the current state of the property; (v) generate a reference response message including the situation information and the reference information; and/or (vi) transmit the reference response message to the user computing device, wherein the reference response message causes at least one of the situation information and the reference information to be displayed on the user computing device as overlaid upon the current view of the user to provide an enhanced situation visualization of the property.

For example, in the event of a natural disaster, a user (e.g., a homeowner or an insurance claims adjuster) may wish to utilize the reality augmentation system described herein to quantify, characterize, and/or catalog a level of damage done to a property. The user may access their computing device and may further access the reality augmentation system using, for example, an application ("app") installed on the user computing device or a web browser. The user may capture a real-time image representative of their current view as they survey the damaged property. The user may then send the real-time image to the ESV computing device within a reference request message transmitted by the user computing device. The reference request message may further include device data (such as, for example, GPS, accelerometer, or compass data from the user computing device, which may enable the ESV computing device to determine a location of the user computing device), account or policy information associated with the user (such as log-in information, an account number, a user name, a policy number), and/or subject identifiers (such as, in this example, a house or building number indicative of the street address of the property).

The ESV computing device, based upon the real-time image and/or any of the additional information included in the reference request message, may determine that the subject of the real-time image (and, therefore, the subject of the user's current view) is the property located at a particular address (e.g., 123 Elm Street, New York City, N.Y.). The ESV computing device may then retrieve information, including a historical image of the property before the damage and other reference information, from the reference database. The reference information may include, in this example, specifications (e.g., square footage, appraisal value, layout) of the property, information regarding an insurance policy associated with the property, the property's building materials, and/or any public utilities available and/or accessible at or near the property.

The ESV computing device may compile, analyze, summarize, and/or otherwise process the historical image and the reference information. In this example, the ESV computing device may be configured to determine—based upon the real-time image, the historical image, and the reference information—an estimated amount of damage, an estimated repair cost, a location of certain damaged or covered utilities, a virtual grid overlay of pre-damage images, an estimated claim amount, an estimated policy coverage amount, and/or an estimated disbursement for repairs. These determinations may be generally referred to as "situation information," as they are specific to the situation and view provided by the user. The ESV computing device may generate a reference response message including the historical image, the reference information, and/or the situation information. The ESV computing device may then transmit the reference response message to the user computing device, such that the historical image may be displayed beside, overlaid upon, or instead of the current view of the user. The reference information and/or the situation information may additionally or alternatively be displayed beside, overlaid upon, or displayed instead of the current view of the user. The current view of the user may be a real-time view captured by a camera of the user computing device.

The user may then easily view and/or record any reference information and/or situation information they determine to be relevant. In the case that the user is a claims adjuster, the user may be able to utilize the situation information and the historical image to more easily make comparisons between the pre- and post-damage property, as well as receive and record suggestions and estimations about repair costs and the extent of any damage. Accordingly, the insurance claims process may be enhanced and simplified for both a homeowner of a damaged property and the insurance claims adjuster.

As another example, a user may have cognitive impairments or disabilities that make it difficult for the user to perform various tasks, such as keeping a medication schedule. The user may have difficulty remembering which medications to take, when to take them, and how much of each medication to take. The user may access their user computing device and capture a real-time image of a current view of their medications (e.g., of a medicine cabinet or of a particular pill or capsule). The user computing device may then generate a reference request message including the real-time image and various other data, which may include barcode scans of the medication containers, SKU data or prescription numbers of the particular medications, or other identifying information for the medication, as well as account data associated with the user (such that the ESV computing device may identify the user). The user computing device may then transmit the reference request message to the ESV computing device.

Upon receiving the reference request message, the ESV computing device may identify or otherwise determine the medications present in the real-time image (i.e., the subject(s) of the real-time image). The ESV computing device may perform subject identification using data included in the reference request message and/or using object recognition technology. The ESV computing device may then retrieve reference information from the reference database, which may include the user's medication schedule, dosage information, and/or medication information (such as warnings or instructions). The ESV computing device may also determine situation information, which, in this example, may include whether the user has taken any of the medications already that day. Such a determination may be made, for example, by determining whether the user has accessed the ESV computing device that day with a prior reference request message and which medication identification(s) were made based upon the previous reference request message. The ESV computing device may generate a reference response message including the situation information, indicating which medications have or have not been taken that day, and/or the reference information, identifying the medications to the user and indicating dosage, compliance, safety, or other instructions.

The ESV computing device may then transmit the reference response message to the user computing device, whereat the reference information and/or the situation information may be displayed beside, overlaid upon, or instead of the current view of the user. In some implementations, certain subjects (e.g., particular objects such as a pill or a medication container) may be highlighted, outlined, or otherwise visually emphasized, such that the experience of the user may be enhanced and simplified.

The methods and system described herein may be implemented using computer programming or engineering techniques including computer software, firmware, hardware, or any combination or subset. At least one of the technical problems addressed by this system includes: (i) inconvenient and imprecise comparison between prior and current states of objects, such as damaged or enhanced properties; (ii) difficulty quantifying and cataloging any differences between states; and/or (iii) an inability to provide guidance or reference for a task as perceived and experienced in a user's current situation.

The system and methods described herein address these technical problems. A technical effect of the systems and processes described herein is achieved by performing at least one of the following steps: (a) receiving a reference request message from a user computing device, the reference request message including an image representative of a current view of a user of the user computing device, the image including a property in a current state; (b) determining a first subject of the image, wherein the first subject is the property; (c) retrieving, from a reference database, reference information associated with the first subject of the image, wherein the reference information includes a historical image of the property in a prior state; (d) determining, based upon the reference request message and the reference information, situation information specific to a situation of the first subject, wherein the situation information includes at least one difference between the prior state and the current state of the property; (e) generating a reference response message including the situation information and the reference information; and/or (f) transmitting the reference response message to the user computing device, wherein the reference response message causes at least one of the situation information and the reference information to be displayed on the user computing device as overlaid upon the current view of the user to provide an enhanced situation visualization of the property.

The technical effect achieved by this system is at least one of: (i) more convenient and efficient comparison between a prior state of an object or property and a current state of the object or property; (ii) simpler quantification and characterization of differences between a prior state and a current state of an object or property; and (iii) situation-based guidance or reference for a task.

"Real-time," as used herein, may refer to at least one of the time of occurrence of events, the time of receipt and/or retrieval predetermined data, the time to process the data, and/or the time of a system response to the events. In the embodiments described herein, these activities and events occur substantially instantaneously. For example, a "real-time image" may refer to an image that is taken and transmitted substantially instantaneously.

"Current view," as used herein, may refer to a visual perspective or point of view available to a user (or user computing device, e.g., a camera on a smart phone) at a time that the user requests enhanced situation visualization. The current view represents the subject(s) at which the user is looking and about which the user may be interested in receiving information.

"Location information," as used herein, may refer to positional or locational data that may enable location of, for example, an item, object, user, user computing device, and/or property (i.e., a subject of the reference request). Location information may include, for example, GPS data (e.g., latitude-longitude data), accelerometer data, compass data, a street address, IP addresses, and/or cellular tower "ping" data.

"Device data" or "device information" as used herein, may refer to any data collected at the device that is representative or descriptive of the situation and/or current view of the user. For example, device data may include location information as described above, camera images or videos that provide the current view, a device identifier of the user computing device, and/or a device descriptor of the type of the user computing device (e.g., wearable device, tablet, smartphone, etc.)

"Reference information," as used herein, may refer to any data (including text, audio, video, and/or image data) that may be stored and may be descriptive of background or reference details about, for example, an item, object, user, and/or property (i.e., a subject of a reference request).

Reference information may include publicly available data about the subject. For example, in the case of a property, such reference information may include prior MLS listing information, publicly available historical satellite- and/or street-view imagery, utility records or plans, and tax records. A "historical image," as used herein, is an image of the subject at a prior time or in a prior state. As another example, reference information may include instruction manuals, safety warnings, and nutritional or ingredient information. Reference information may also include user-specific information (e.g., medication information, street address, insurance policies, user calendars or schedules) and/or information specific to one or more vendors maintaining the ESV computing device (e.g., propriety underwriting information or loan information associated with a property).

"Situation information," as used herein, refers to details about a user's situation that are determined based upon reference information and information included in a reference request message. In one example, a user may view a property that has been damaged or destroyed by a natural disaster, and may transmit a reference request message including location information and an image of the damage. The reference information for the property may include a historical image of the property, public utilities available at the property (e.g., location of a gas main or storm drain), and/or a current value of an associated insurance policy. The situation information may include a location of the property, an extent of the damage, a remediation suggestion, and/or safety warnings about remaining dangers in the area (e.g., downed power lines). In a second example, a user may be viewing their medication, and may transmit a reference request message including an image of the medication container. The reference information may include a prescription schedule for the user and safety guidelines for the medication. The situation information may include a status indicator (e.g., whether a medication has been taken or not) and/or a schedule reminder (e.g., that it is time to take a third dosage of a particular medication).

I. Exemplary Reality Augmentation Computer System

FIG. 1 depicts a schematic view of an exemplary reality augmentation system 100 for providing enhanced situation visualization. In the example embodiment, system 100 may include an enhanced situation visualization (ESV) computing device 102 and a client subsystem, also referred to as user computing device 104, communicatively coupled to ESV computing device 102. User computing device 104 may be any device capable of interconnecting to the Internet including a mobile computing device or "mobile device," such as a smartphone, a personal digital assistant (PDA), a tablet, a wearable device (e.g., a "smart watch" or a personal projection device such as "smart glasses"), a "phablet," or other web-connectable equipment or mobile devices. Although only one user computing device 104 is shown in FIG. 1, it should be understood that any number of user computing devices 104 may be in communication with ESV computing device 102.

Additionally, a database server 106 may be connected to a reference database 108 containing information on a variety of matters, as described below in greater detail. In one embodiment, reference database 208 may be stored on ESV computing device 102. In any alternative embodiment, reference database 208 may be stored remotely from ESV computing device 202 and may be non-centralized.

ESV computing device 102 may be configured to receive a reference request message from user computing device 104. In one embodiment, a user of user computing device 104 may transmit such a reference request message from user computing device 104 using an app or similar software installed on their user computing device 104. In another embodiment, the user may transmit the reference request message via a web browser on their user computing device 104. The reference request message is transmitted to the ESV computing device 102 via a network (e.g., a wireless cellular or IP network). As described more fully herein, the reference request message includes at least an image representative of a current view of the user of user computing device 104. In some cases, the user may choose to capture an image of a particular view and then transmit the reference request message including the image at a later time. In such a case, the image may not be of a "current view" in the sense that a user is still seeing such a view, but may still be considered a "current view" in the sense that the view is current (or relatively so) relative to the situation about which the user is sending the reference request message. Accordingly, the phrase "current view" should not be construed to limit the embodiments described herein to only those reference request messages sent immediately after capturing an image.

ESV computing device 102 performs object recognition on the image received in the reference request message to determine a subject of the image. In the exemplary embodiment, the reference request message further includes device information, as described above, which may facilitate object recognition (e.g., by providing a location of the subject). Once the subject of the image, and thereby the subject of the reference request message, has been determined, ESV computing device 102 retrieves reference information associated with the subject(s) of the image. In some cases, there may be one subject of an image; in other cases, there may be more than one subject(s) of an image. ESV computing device 102 may be configured to determine a primary subject if there is more than one determined subject, wherein the primary subject is the subject most likely of interest to the user. ESV computing device 102 may additionally or alternatively be configured to consider all determined subjects of an image when retrieving associated reference information. Accordingly, wherein "a subject" is used herein, it should be understood that one or more subjects may be present. Reference information may be stored on reference database 108 and may be indexed by subject, such that upon determination of the subject by ESV computing device 102, corresponding reference information may be easily retrieved.

ESV computing device 102 may further determine situation information based upon the information received in the reference request message, including the image and the device information, as well as on the retrieved reference information. The situation information may be specific and relevant to the situation of the user (i.e., the situation depicted in the received imaged), as described more fully herein. ESV computing 102 returns a reference response message including the reference information and the situation information, and may display any or all of the reference information and/or situation information to the user on a display of user computing device 104, such that the user may have an enhanced visualization of their situation. ESV computing device 102 may further be configured to receive indication(s) of user action(s) at user computing device 104. For example, the user may turn in a different direction or may focus on a different subject, which may require the transmission of a new reference request message and reference response message. ESV computing device 102 may be configured to determine a similarity between past and current views and/or subject(s), and thus may only adjust a certain aspect of the reference information retrieved and/or the situation information generated. For example, if the user chose to focus their current view on a second property next door to a first property about which a first reference request-response pair was already generated, ESV computing device 102 may retain some of the public information (e.g., utility information, risk of natural disasters, etc.) retrieved for the previous reference response. Accordingly, ESV computing device 102 may generate the second reference response message more efficiently and/or may facilitate comparison between the first and second reference response messages.

Reality augmentation system 100 may further include beacon 110. Although only one beacon 110 is shown in FIG. 1, it should be understood that reality augmentation system 100 may include any number of beacons 110 without departing from the scope of the present disclosure. Each beacon 110 may be associated with and coupled to an item of interest (e.g., a valuable item or an easy to lose item) to facilitate location of the item of interest in the event that the item is lost (e.g., following a natural disaster). In an exemplary embodiment, a user (e.g., a homeowner) may go through a set-up or initiation phase to activate beacons 110. The user may manually associate each of beacons 110 with a particular item of interest, for example, by filling out a physical or virtual form that matches a beacon ID (e.g., an alphanumeric code) to the item of interest to which that beacon is coupled. Accordingly, reference database 108 and/or ESV computing device 102 may store a table (or any other suitable reference object) including those associations between beacons 110 and the item(s) of interest. During use, ESV computing device 102 may be in communication with beacon 110, which may be an active beacon (e.g., continuously or periodically emitting and/or transmitting signals to ESV computing device 102) or a passive beacon (e.g., responding to interrogation signals transmitted by ESV computing device 102). When an item of interest is lost, the user may send a beacon activation request with the reference request message (e.g., included within the reference request message or as an addendum). Such a request may be sent by default when a reference request message is transmitted, or the user may select a particular option to send the beacon activation request. ESV computing device receives signals from beacon 110 and transmits the received signals to the user of the user computing device, for example, as directional icons to locate the associated item of interest, as will be described further herein.

In one exemplary embodiment, reality augmentation system 100 may further include an insurance server 112, which may be in communication with ESV computing device 102, user computing device 104, and/or reference database 108. Insurance server 112 may be associated with and/or maintained by an insurance provider. Insurance server 112 may provide reference information to reference database 108, such as, for example, policy information (e.g., policy amount, premium, discount) associated with a particular subject, historical images of the subject taken for underwriting purposes, past claims involving the subject or a user associated with the subject, and/or propriety underwriting information associated with the subject and/or a corresponding policy.

Additionally or alternatively, insurance server 112 may receive either or both of the reference request message generated by user computing device 104 and the reference response message generated by ESV computing device 102. For example, for a user computing device 104 associated with the insurance provider (e.g., a user computing device 104 used by an employee of the insurance provider), the user computing device 104 may also transmit the reference request message (or a copy thereof) to insurance server 112, such that any records (e.g., policy or claims records) associated with the subject of the message may be updated with the information included in the reference request message. ESV computing device 102, after determining the subject of the reference quest message, may identify an insurance policy associated with the subject. ESV computing device 102 may then also transmit the reference response message (or a copy thereof) to insurance server 112 associated with a provider of the policy, such that any records (e.g., policy or claims records) associated with the subject of the message may be updated with the information included in the reference response message. Alternatively, user computing device 104 may transmit some or all of the information in the reference response message to insurance server 112 for the same purpose.

In addition, insurance server 112 may use any or all of the received information (from either or both of the reference request message and the reference response message) to automatically populate a relevant insurance form. For example, if a claims adjust generates a reference request message for a damaged property, insurance server 112 may receive information in the reference response message including the subject of the request (i.e., the property), the date and/or time of the request, an estimated amount of damage, and/or an estimated claim amount. Insurance server 112 may then retrieve any policy information associated with the property (e.g., a homeowner's insurance policy). Any or all of this information may be used to populate a claims form automatically, saving the claims adjuster and a homeowner of the property time and effort in manually populating such a form. Insurance server 112 may populate the claims form using the reference and/or situation information received from ESV computing device 102. Additionally or alternatively, insurance server 112 may transmit the claims form to ESV computing device 102, which may populate at least one field of the claims form with the reference information and/or the situation information. ESV computing device 102 may then transmit the populated claims form back to insurance server 112.

II. Enhanced Situation Visualization: Property Damage or Loss

The following examples are illustrative of various aspects and embodiments of the disclosure described herein. Accordingly, it should be understood that such examples are for illustration only and do not limit the scope of the present disclosure.

Figure 2:
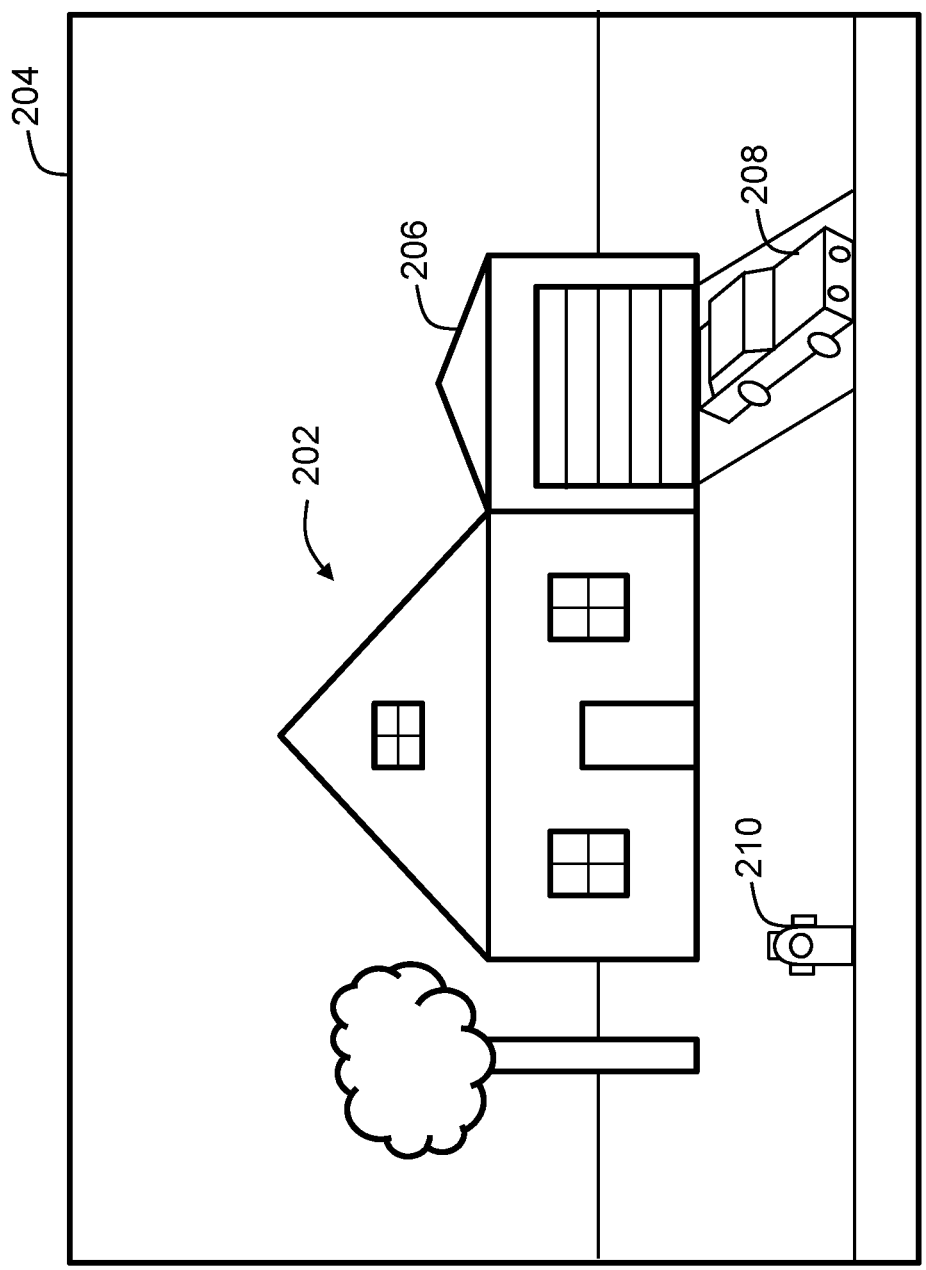
FIG. 2 illustrates an exemplary historical image of a property for which enhanced situation visualization may be provided by the ESV computing device shown in FIG. 1.

FIGS. 2-8 illustrate various aspects of the disclosure using an example of a damaged property. In particular, FIG. 2 depicts a historical image 204 of a property 202. The historical image 204 may be representative of a past view of the property 202 (at a time antedating a current view 300, shown in FIG. 3). The historical image 204 may be associated with additional reference information about the property 202 including, for example, property specifications, the presence of a garage 206, a vehicle 208 associated with the property 202 and/or with occupant(s) of the property 202, and/or access to a public utility in the form of a fire hydrant 210. The historical image 204 and the additional reference information may be stored in reference database 108 (shown in FIG. 1). Additionally, the historical image 204 and/or the additional reference information may be indexed by (e.g., have tags associated with or be searchable by) the type of the property 202 (e.g., residential), a street address and/or geographic location of the property 202, a type and/or amount of an insurance policy associated with the property 202, and/or risks associated with the property 202 (e.g., higher risk of a natural disaster due to geographic location, lower risk of fire damage due to location of the fire hydrant 210). In other words, the reference information associated the property 202 (including the historical image 204) may be indexed such that ESV computing device 102 (shown in FIG. 1) may retrieve it when the property 202 is a subject of a reference request message.

Figure 3:
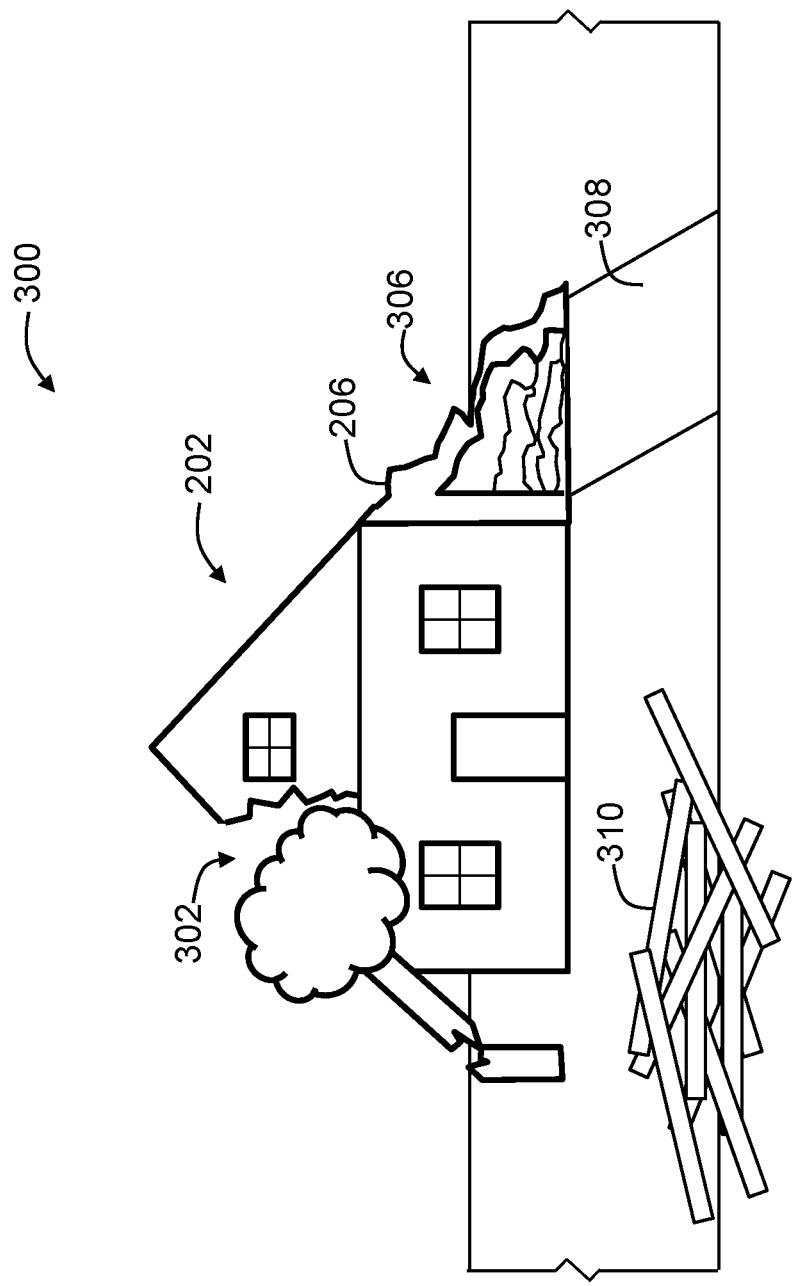
FIG. 3 illustrates an exemplary current view of the property shown in FIG. 2.

FIG. 3 depicts a current view 300 (e.g., a current view of a user) of the property 202 (shown in FIG. 2) after the property 202 has been damaged, for example, by a natural disaster such as a tornado. The current view 300 may include damage 302 to the main structure of the property 202 (i.e., the house), damage 306 to the garage 206, an empty driveway (i.e., no vehicle 208 present), and a pile of debris 310 located where the fire hydrant 210 was located, as shown in FIG. 2. Although it is clear that there is damage, it may be unclear the nature and the extent of the damage.

Figure 4:
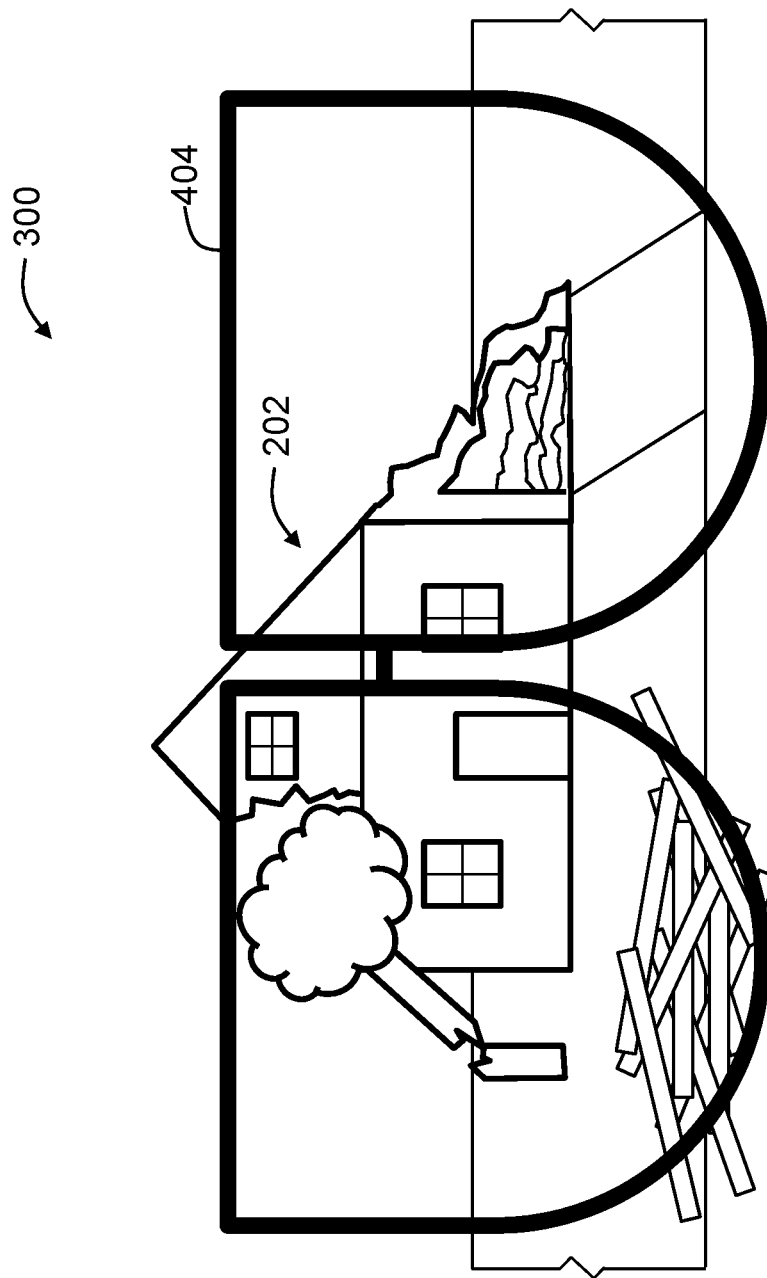
FIG. 4 illustrates an exemplary current view of the property shown in FIG. 3, including a user computing device.

FIG. 4 depicts the current view 300 of the property 202 in the damaged state as shown in FIG. 3, including a user computing device 404. User computing device 404 is illustrated as a personal projection device (e.g., glasses) but may be any other user computing device as described herein without departing from the scope of the disclosure. User computing device 404 may be similar to user computing device 104, shown in FIG. 1. In the exemplary embodiment of FIG. 4, the user of user computing device 404 may not yet have activated or called ESV computing device 102 (shown in FIG. 1). For example, the user may not have yet activated or opened an app associated with reality augmentation system 100 (shown in FIG. 1) to prepare and transmit a reference request message to ESV computing device 102. Alternatively, user computing device 404 has not yet received a reference response message from ESV computing device 102, or may be in various stages of generating and/or transmitting a reference request message. The view displayed on user computing device 404 may be a real-time view as captured by a camera (not shown) of user computing device 404 or may be a still image of current view 300.

Figure 5:
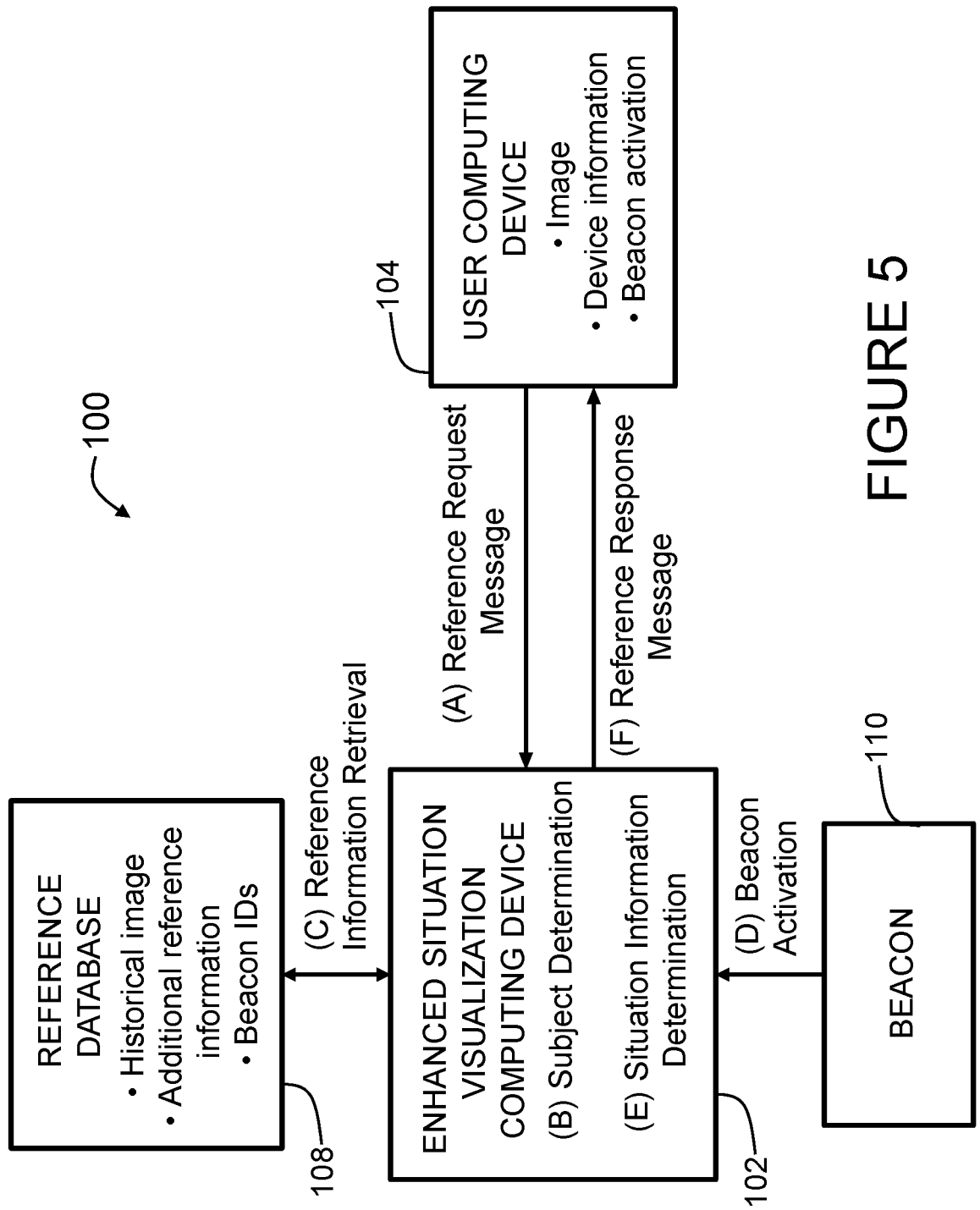
FIG. 5 depicts a block diagram illustrating the transmission of a reference request message and a reference response message between various components of the exemplary reality augmentation system shown in FIG. 1.

FIG. 5 depicts a block diagram illustrating the transmission of a reference request message and a reference response message between various components of reality augmentation system 100 shown in FIG. 1. The reference request and response may be directed to the situation depicted in FIGS. 2-4, namely the damage of the property 202. User computing device 104 may (A) transmit a reference request message to ESV computing device 102. In the exemplary embodiment, the reference request message may include an image of the property 202 and device information (e.g., GPS data and compass data). The reference request message may further include a beacon activation request, should the user of user computing device 104 have any beacons 110 associated with items of interest that were in, around, or otherwise associated with the property 202. In some embodiments, the reference request message may further include user account or profile information, which may identify the user and/or user computing device 104, such that any proprietary or personal information that may be relevant to the subject or the situation may be retrieved. The user profile information may enable ESV computing device 102 to obtain, for example, insurance policy information associated with the property. Such policy information may be provided to reference database 108 by insurance server 112 (shown in FIG. 1).

ESV computing device 102 may receive the reference request message and may subsequently (B) determine a subject of the image included therein and determine that the subject of the image is the property 202. ESV computing device 102 may use device information to enhance the accuracy of the subject determination. ESV computing device 102 may then (C) retrieve reference information associated with the property 202 (i.e., the subject of the reference request message) from reference database 108. As described above, the reference information may include the historical image 204 (shown in FIG. 2) and additional reference information, which may be indexed by subject. Reference database 108 may also store a lookup table or other reference object that facilitates identification of beacons 110 and associated items of interest. ESV computing device 102 may (D) activate (e.g., interrogate or process signals from) beacons 110 associated with the user.

ESV computing device 102 may use the reference request message and the reference to (E) determine situation information relevant to the user's situation. For example, ESV computing device 102 may compare the historical image 204 of the property 202 with the received image of the current view 300 to identify areas that have been damaged and/or items that are missing (e.g., not present in the image of the current view 300). ESV computing device 102 may further use the additional reference information, such as property specifications and underwriting information, to identify various building materials used in the damaged areas and/or rooms that have been damaged (e.g., a kitchen or bathroom suffering major damage may be more costly to repair than a bedroom, attic space, or a closet). ESV computing device 102 may be further configured to make damage estimates, based upon the comparisons and using spatial calculations, and may subsequently determine repair cost estimates or a dollar amount that should be requested in an insurance claim, based upon the identified building materials and damage estimates.

It should be understood that in other situations, such as a reconstruction or renovation of a property or an addition to a property, ESV computing device 102 may be configured to determine situation information in a similar manner but "in reverse." For example, ESV computing device 102 may perform largely the same functions in determining a subject, retrieving reference information, comparing a current state of the property to a past state, identifying building materials used, and using spatial calculations to determine a volume or area of addition (as opposed to damage or volume/area missing). ESV computing device 102 may then be configured to make estimates regarding value added to a property and/or an appropriate insurance policy increase (e.g., increase in premiums).

Returning to the example of FIG. 5, ESV computing device 102 may (E) determine additional situation information associated with received beacon signals, in embodiments in which any beacons 110 are associated with the user and/or the property. ESV computing device 102 may use the device information received in the reference request message to compare the location of user computing device 104 to the location of beacon 110.

ESV computing device 102 may compile and/or summarize the reference information and the situation information into the reference response message. The reference response message may then (F) be transmitted to user computing device 104, where information in the reference response message (i.e., any or all of the reference information and/or the situation information) may be displayed to the user on a display of user computing device 104 to provide an enhanced situation visualization. Additionally, ESV computing device 102 may include the relative location of beacon 110 (to user computing device 104) in the reference response message and may facilitate the translation or conversion of the relative location of beacon 110 into a graphical representation, such as an icon, as will be described more fully with respect to FIG. 8.

Figure 6:
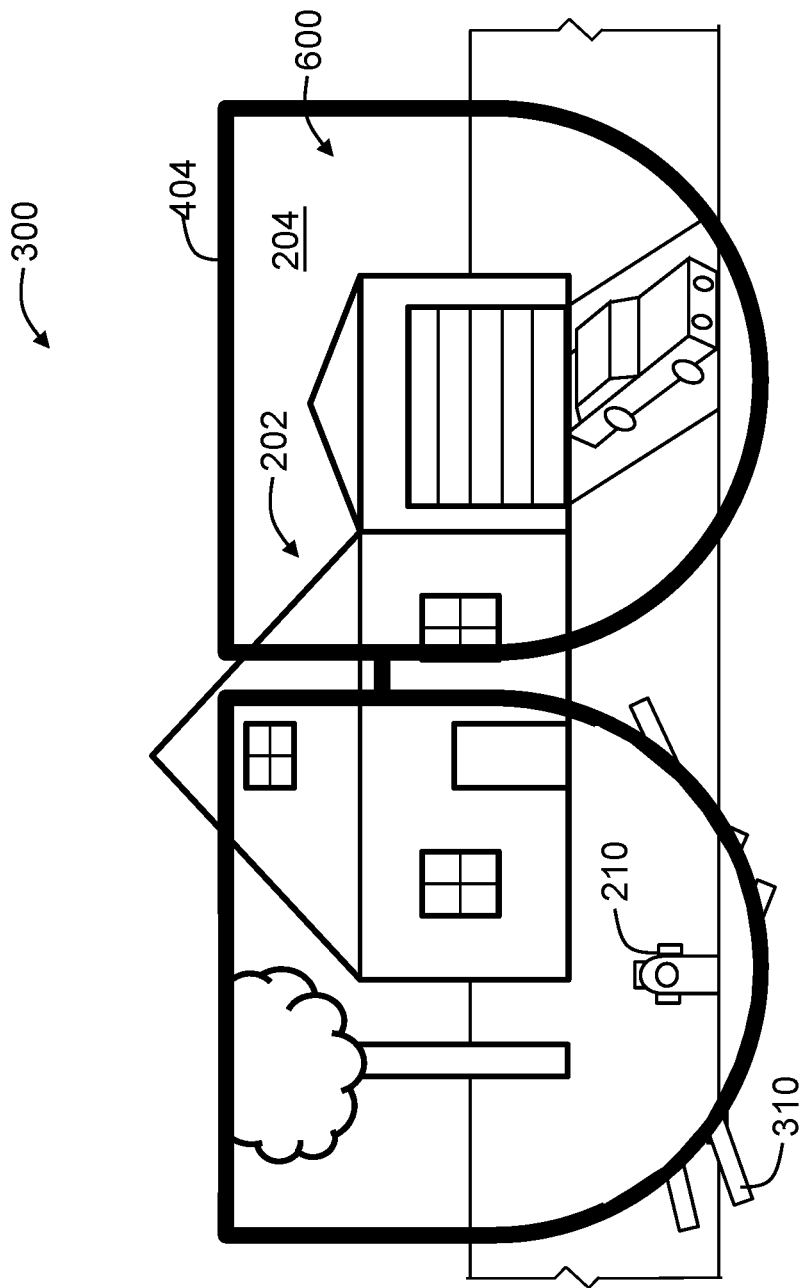
FIG. 6 illustrates a first exemplary view of an enhanced situation visualization provided by the ESV computing device shown in FIG. 1.

FIG. 6 depicts a first exemplary view of an enhanced situation visualization 600 on user computing device 404 (as shown in FIG. 4). In the exemplary embodiment, user computing device 404 has received the reference response message from ESV computing device 102, as described above with respect to FIG. 5. The reference information included in the reference response message (i.e., the historical image 204 of the property 202, in the exemplary embodiment of FIG. 6) has replaced the current view 300 of the property 202 on the display of user computing device 404. (Note that the current view 300, outside of user computing device 404, has not changed, as evidenced by the pile of debris 310 and the missing tree-top visible outside of the boundary/display area of user computing device 404.) Although the enhanced situation visualization 600 is depicted to be opaque (i.e., show no part of the current view 300 on the display of use computing device 404) for the sake of clarity, it should be understood that the enhanced situation visualization 600 may be translucent. Accordingly, the user of user computing device 404 may easily see the state of the property 202 before it was damaged. The user may be able to see, for example, the location of the fire hydrant 210 before it was covered by debris 310, and that the property 202 has an associated vehicle 208. The user may also be able to compare the historical image 204 with the current view 300 (e.g., by momentarily deactivating the enhanced situation visualization 600 and/or user computing device 404, or by moving user computing device 404) to characterize, quantify, and/or catalog the damage done to the property 202. Enhanced situation visualization 600 may be displayed as an enhancement of a real-time view as captured by a camera of user computing device 404 or as an enhancement of a still image of the current view 300.

Figure 7:
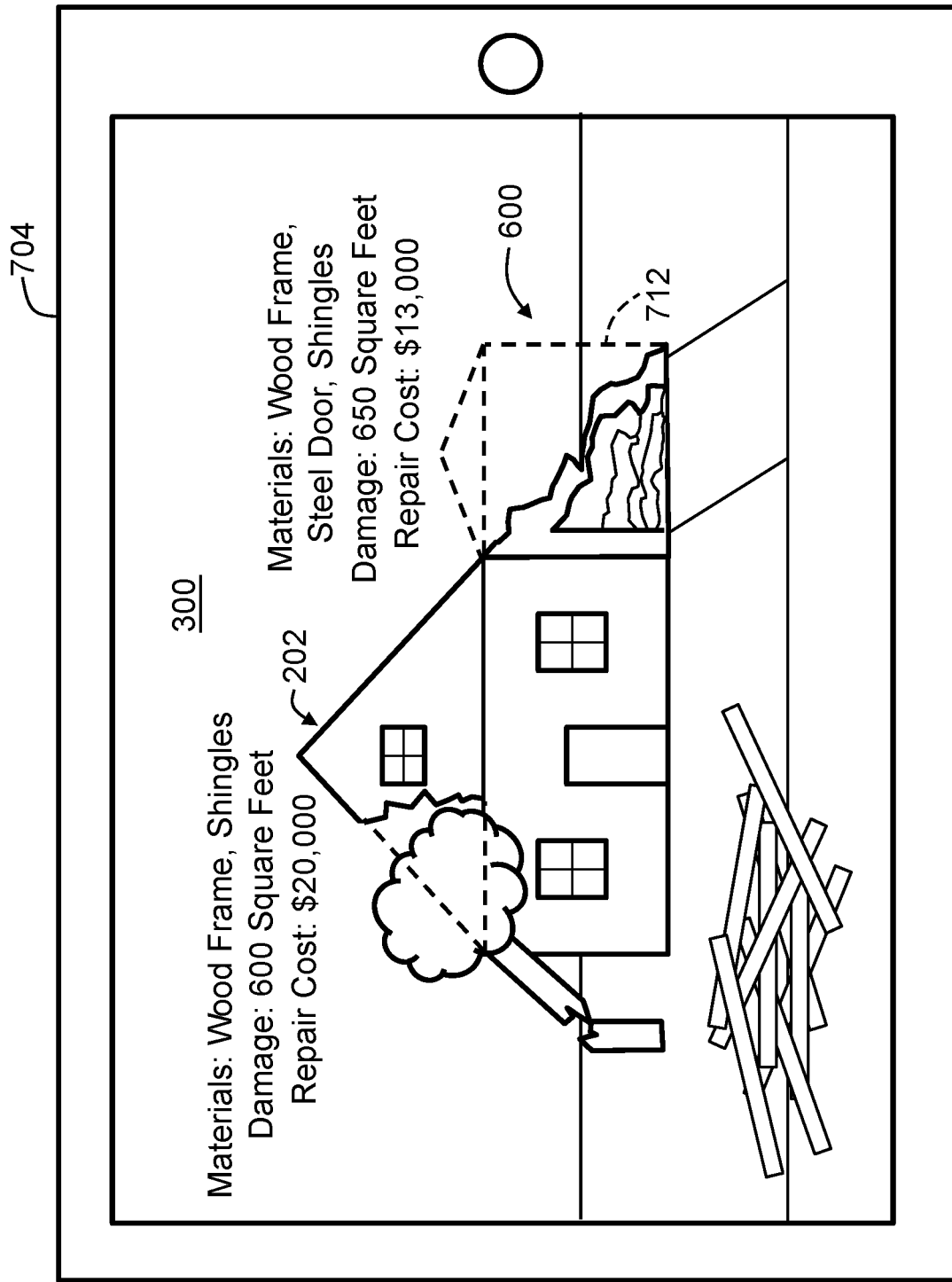
FIG. 7 illustrates a second exemplary view of an enhanced situation visualization provided by the ESV computing device shown in FIG. 1.

FIG. 7 depicts a second exemplary view of an enhanced situation visualization 700 on user computing device 704. In the exemplary embodiment, user computing device 704 is illustrated as a tablet or smartphone but may be any other user computing device as described herein without departing from the scope of the disclosure. User computing device 704 may be similar to user computing device 104 shown in FIG. 1 and/or user computing device 404 shown in FIGS. 4 and 6. As illustrated, the reference information—the description of the building materials of the property—and situation information—the estimated damage and the estimated cost to repair—are overlaid upon the current view 300 of the property. Moreover, in one exemplary embodiment, the situation information received in the reference response message further includes a virtual grid 712 of the property 202 in its pre-damage state overlaid on the current view 300 of the property 202. Accordingly, a user may not only visualize an extent of any damage by comparing the damaged property 202 to the pre-damage virtual grid 712, but may also quantify and catalog the damage and cost to repair the damage using the other situation information provided. In other embodiments, more or less reference information and/or situation information may be displayed on the display area of user computing device 704.

User computing device 704 may be configured to capture user actions associated with the content displayed on user computing device 704 and may configured to transmit an indication of the user actions to ESV computing device 102. For example, the user of user computing device 704 may be an insurance adjuster that is viewing the home to catalog the damage and provide an estimate of the appropriate claim disbursement. Upon viewing the enhanced situation visualization 700 provided by ESV computing device 102, the user may wish to save (e.g., copy to a document) or share (e.g., send in an email or other message) the information provided. User computing device 704 may be configured to capture the user actions by receiving a voice command, a touch command, a button selection, or any other form of user input to user computing device 704. For example, the user may initiate a "save" command, and user computing device 704 may copy the content of the enhanced situation visualization to a document (e.g., a claims disbursement form or other insurance-related tool) or may transmit an instruction to ESV computing device 102 to do the same.

Figure 8:
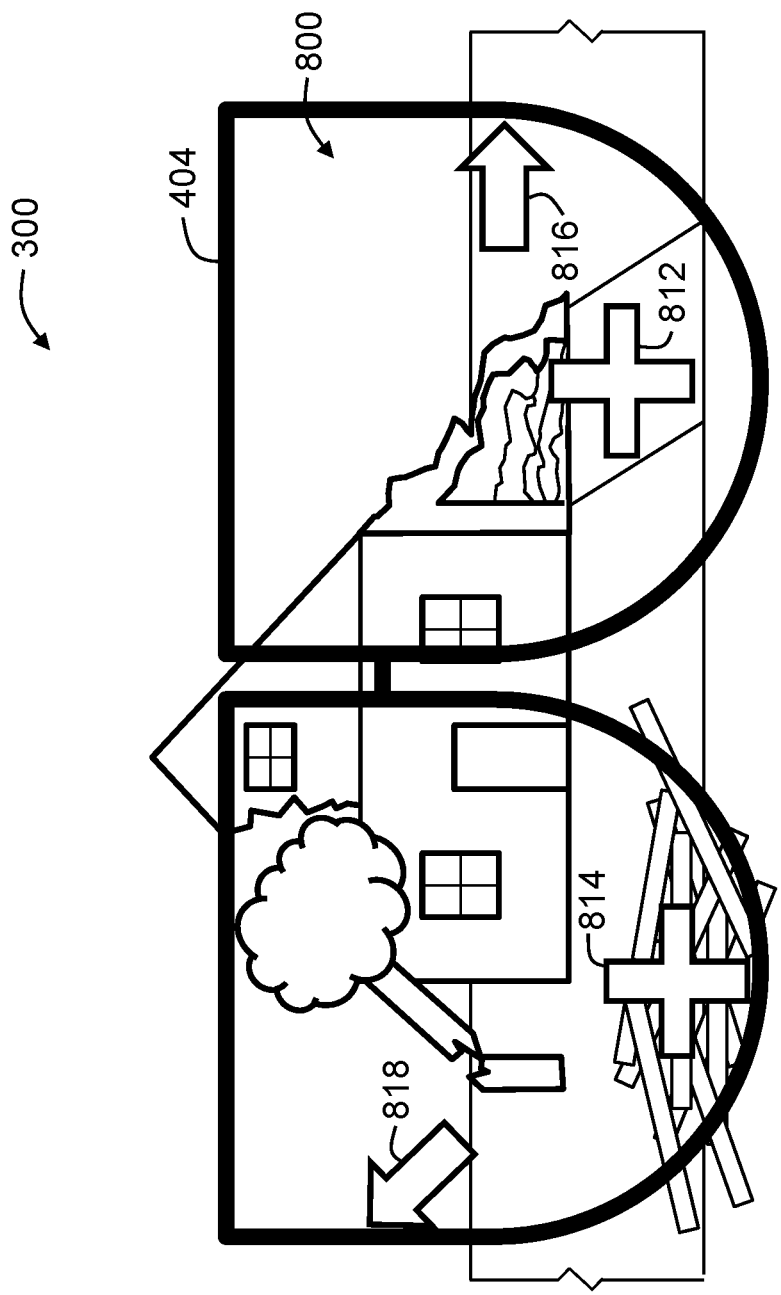
FIG. 8 illustrates a third exemplary view of an enhanced situation visualization provided by the ESV computing device shown in FIG. 1.

FIG. 8 depicts a third exemplary view of an enhanced situation visualization 800 on user computing device 404. In the exemplary embodiment, several icons 812, 814, 816, and 818 are displayed over the current view 300. Though there are four icons illustrated, in other embodiments, there may be more, fewer, or no icons displayed on the display area of user computing device 404. In the exemplary embodiment, two icons 812, 814 may generally indicate a location of known elements of the property 202, based at least in part on the reference information (e.g., one or more historical images 204 of the property 202 and/or public works information). Icon 812 may display the expected location of the vehicle 208 shown in the historical image 204 (shown in FIG. 2), calling the user's attention to its absence. In some cases, the vehicle 208 may simply have been moved by user or another person associated with the vehicle 208. In other cases, the vehicle 208 may have been displaced due to the natural disaster. Icon 814 may indicate the expected location of the fire hydrant 210 shown in the historical image 204, calling attention to the fact that the fire hydrant 210 may be covered by the debris 310 after the natural disaster.

In the exemplary embodiment, two icons 816, 818 may provide additional situation information associated with a location of beacon(s) 110 (shown in FIG. 1), relative to user computing device 404 ("beacon information"). These icons 816, 818 may guide the recovery of items that may have been displaced as a result of the natural disaster and/or the damage to the property 202. These icons 816, 818 may include an object or item tag, associating each icon 816, 818 with the item of interest that was associated with a corresponding beacon 110 during the set-up or initialization phase, as well as directional and/or distance information. For example, icon 818 may display the following text: Jewelry Box|10 feet West. User computing device 404 may transmit an indication of user action(s) to ESV computing device 102 after displaying the enhanced situation visualization 800. For example, user computing device 404 may transmit new device and/or location information indicating that the user has moved in the direction of a beacon 110, such that ESV computing device 102 may transmit an updated reference response message with the new relative location of beacon 110. As another example, the user may wish to focus on only one beacon 110 at a time, and may request that one of the icons 816, 818 be removed from the display. Such removal may be performed by user computing device 404 or ESV computing device 102 (e.g., by sending an updated reference response message without beacon information for the beacon 110 corresponding to the removed icon 816 or 818).

III. Enhanced Situation Visualization: Situation Guidance

FIGS. 9-13 illustrate various aspects and embodiments of the disclosure using examples involving situation guidance.

A. Medication Compliance

Figure 9:
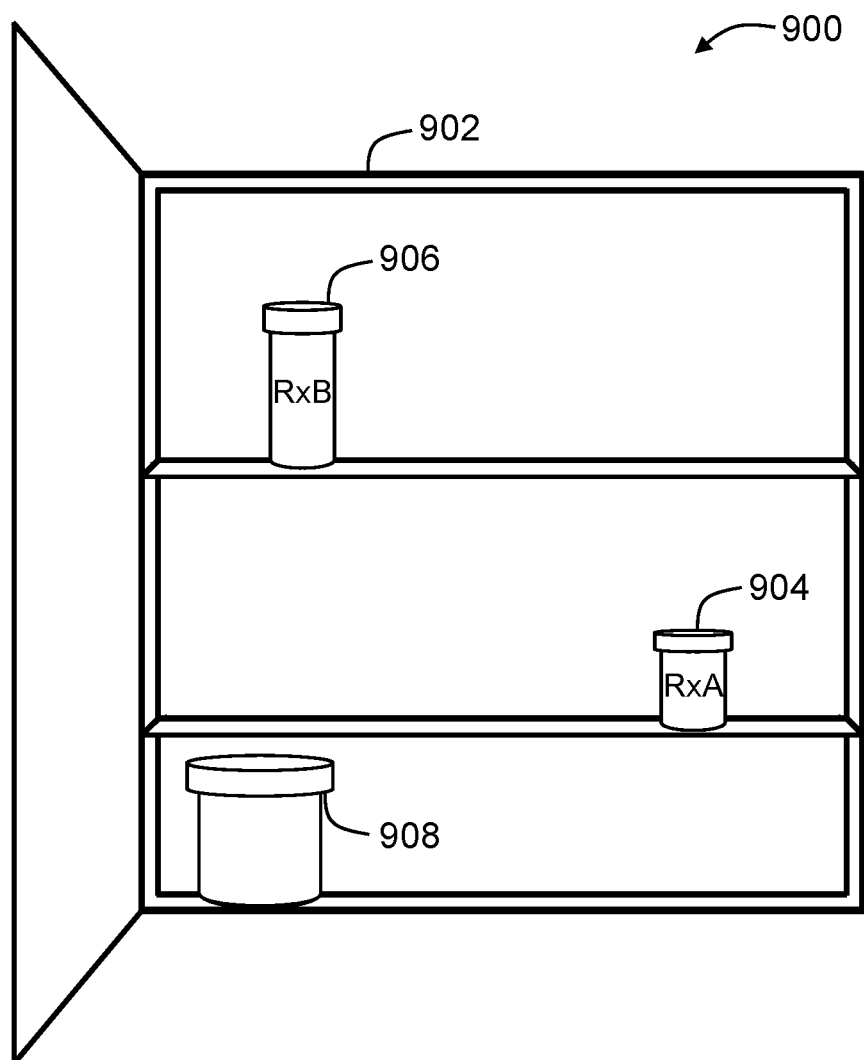
FIG. 9 illustrates an exemplary current view of a medicine cabinet for which enhanced situation visualization may be provided by the ESV computing device shown in FIG. 1.

More specifically, FIG. 9 depicts a current view 900 (e.g., a current view of a user) of a medicine cabinet 902. In the exemplary embodiment of FIG. 9, there are three medication containers 904, 906, and 908. It should be understood that there are many other layouts, orientations, and contents of medicine cabinets, and the illustration of FIG. 9 is not meant to limit the disclosure to any particular implementation. Some of the medication containers 904, 906 may contain prescription medications associated with the user; for example, medication container 904 may contain Rx A and medication container 906 may contain Rx B. The user's compliance to a treatment schedule may have an impact on the efficacy of the prescription medication(s). However, the user may have difficulty maintaining compliance with one or both of Rx A and Rx B. For example, the user may simply forget to take their prescriptions, or the user may have a mental or cognitive disability or impairment. The user may access their medicine cabinet 902 and may be unsure which prescription(s) they need to take, how much (i.e., what dosage) they need, and/or whether they have already taken one or both medications that day (or week, month, or other scheduled treatment period).

Figure 10:
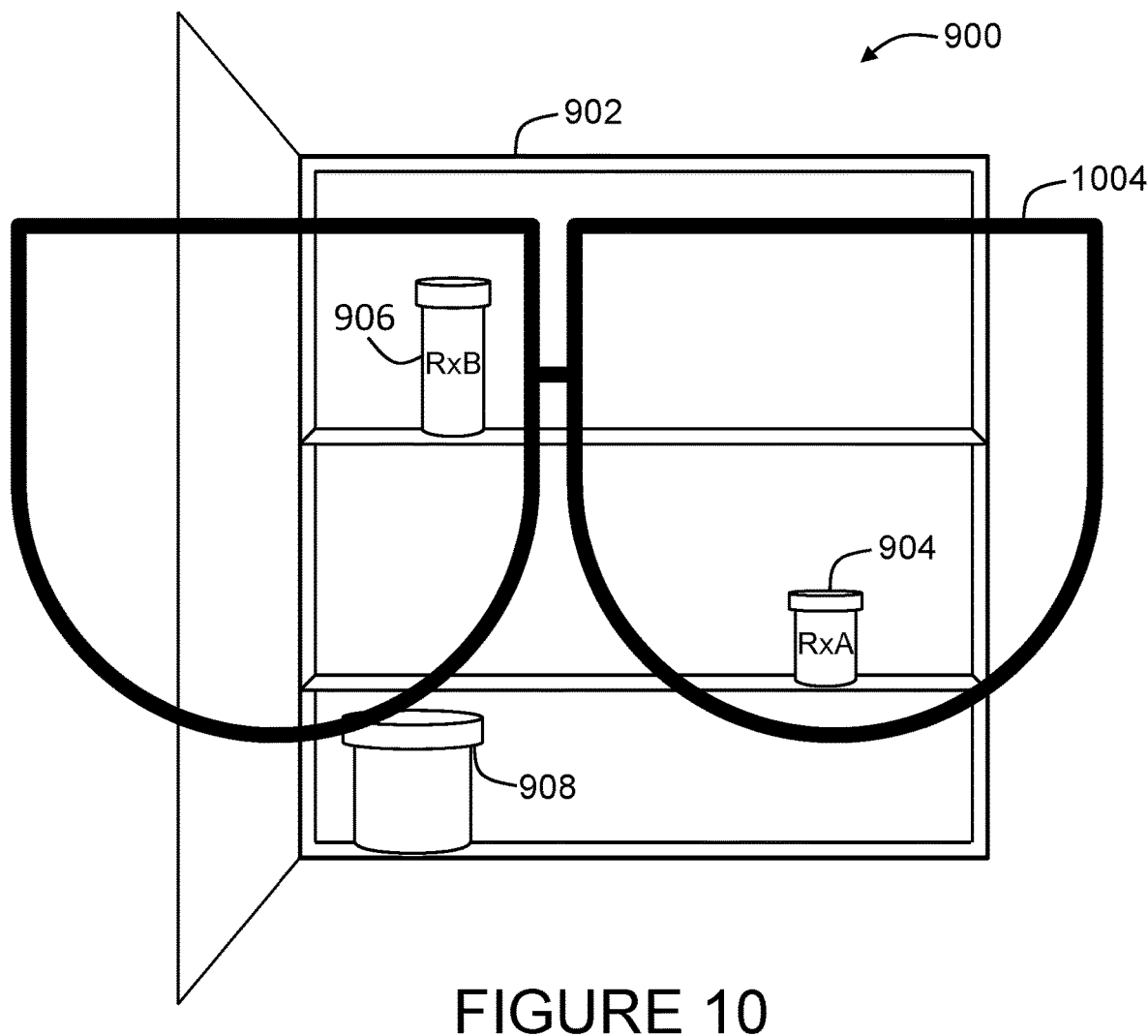
FIG. 10 illustrates an exemplary current view of the medicine cabinet shown in FIG. 9, including a user computing device.

FIG. 10 depicts the current view 900 of the medicine cabinet 902 including a user computing device 1004. User computing device 1004 may be similar to user computing device 104 shown in FIG. 1, user computing device 404 shown in FIG. 4, and/or user computing device 704 shown in FIG. 7. The user of user computing device 1004 may capture an image representative of the current view 900 of FIGS. 9 and 10, and may send a reference request message to ESV computing device 102 (shown in FIG. 1) including at least the image of the current view 900. Similar to the steps described with respect to FIG. 5, ESV computing device 102 may receive the reference request message and may determine a subject of the image. The reference request message may further include user profile/account information, which may enable ESV computing device 102 to access a personal medication schedule for the user, as well as prescription numbers or identifiers (e.g., from reference database 108, shown in FIG. 1) that facilitate identification of the particular medications Rx A and Rx B depicted in the image. ESV computing device 102 may further retrieve any additional reference information from reference database 108, including any safety warnings associated with the medication(s) Rx A and/or Rx B.

ESV computing device 102 may then determine situation information relevant to the user's current situation, including which medication(s) are appropriate to take at the current time, which medication(s) have already been taken according to the user's schedule, and/or any potentially adverse reactions the user should avoid based upon other medication and/or foods previously consumed. ESV computing device 102 may compile and/or summarize the above-described information into the reference response message, which may then be sent to user computing device 104 to provide an enhanced situation visualization 1100, as shown in FIG. 11.

Figure 11:
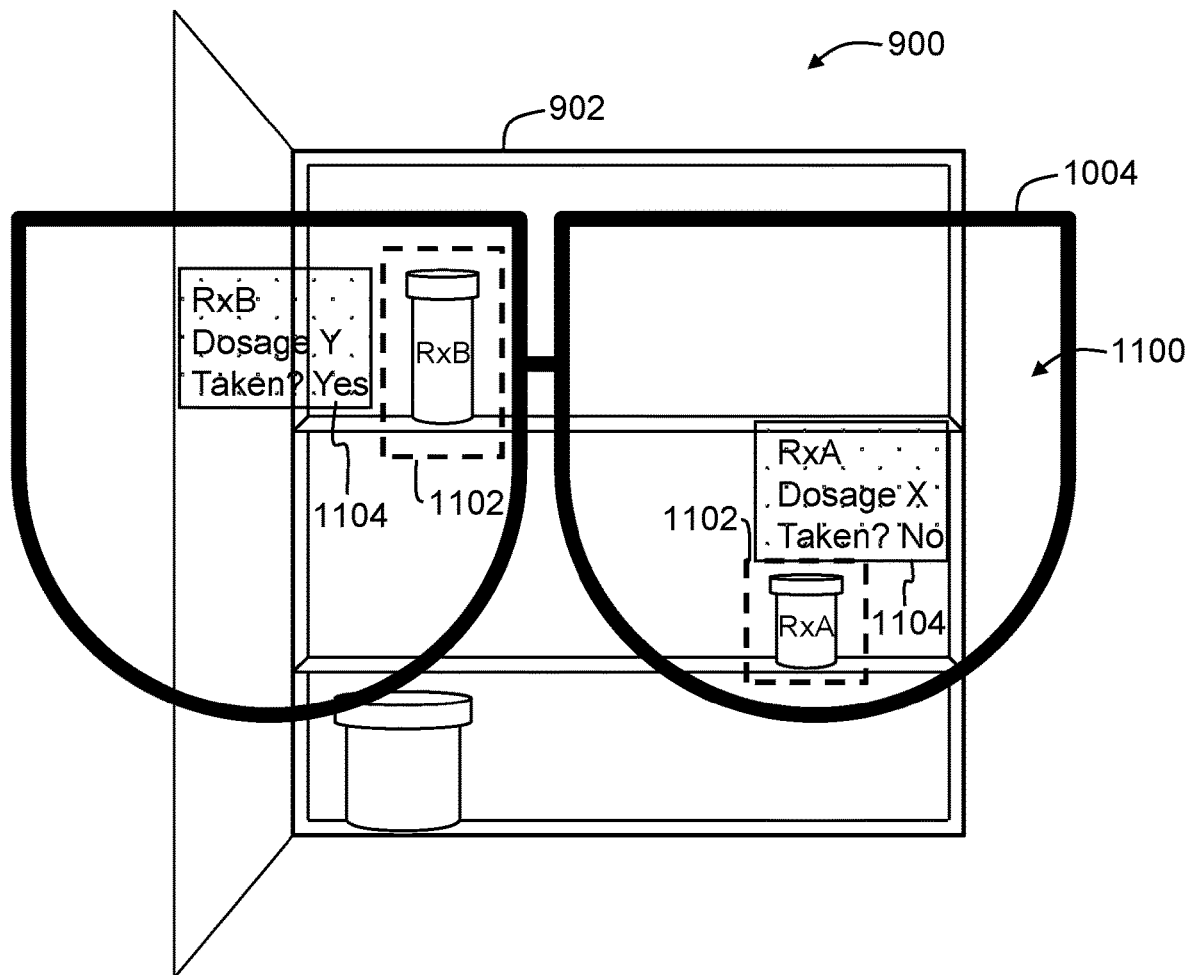
FIG. 11 illustrates an exemplary view of an enhanced situation visualization of the medicine cabinet shown in FIG. 9 provided by the ESV computing device shown in FIG. 1.

FIG. 11 depicts an exemplary view of an enhanced situation visualization 1100 of the medicine cabinet 902 shown in FIG. 9. In the exemplary embodiment, user computing device 1004 displays reference and situation information overlaid upon the current view 900 of the user. The situation information may include an indicator 1102 of the subject of the current view 900 (e.g., by highlighting, outlining, or otherwise accenting at least one subject of interest), and the reference information may include a description of the subject(s) (e.g., "Rx A" or "Rx B", dosage information). The situation information displayed may further include a status indicator 1104. In the exemplary embodiment of FIG. 11, the status indicator 1104 may denote whether or not the user has yet taken the medication. Accordingly, using the enhanced situation visualization 1100 provided by ESV computing device 102, the user may be readily able to understand his/her needs and may act safely in accordance with those needs. For example, the user may know that they must take a particular required dosage of Rx A, and that they have already taken a maximum dosage of Rx B.

Figure 12:
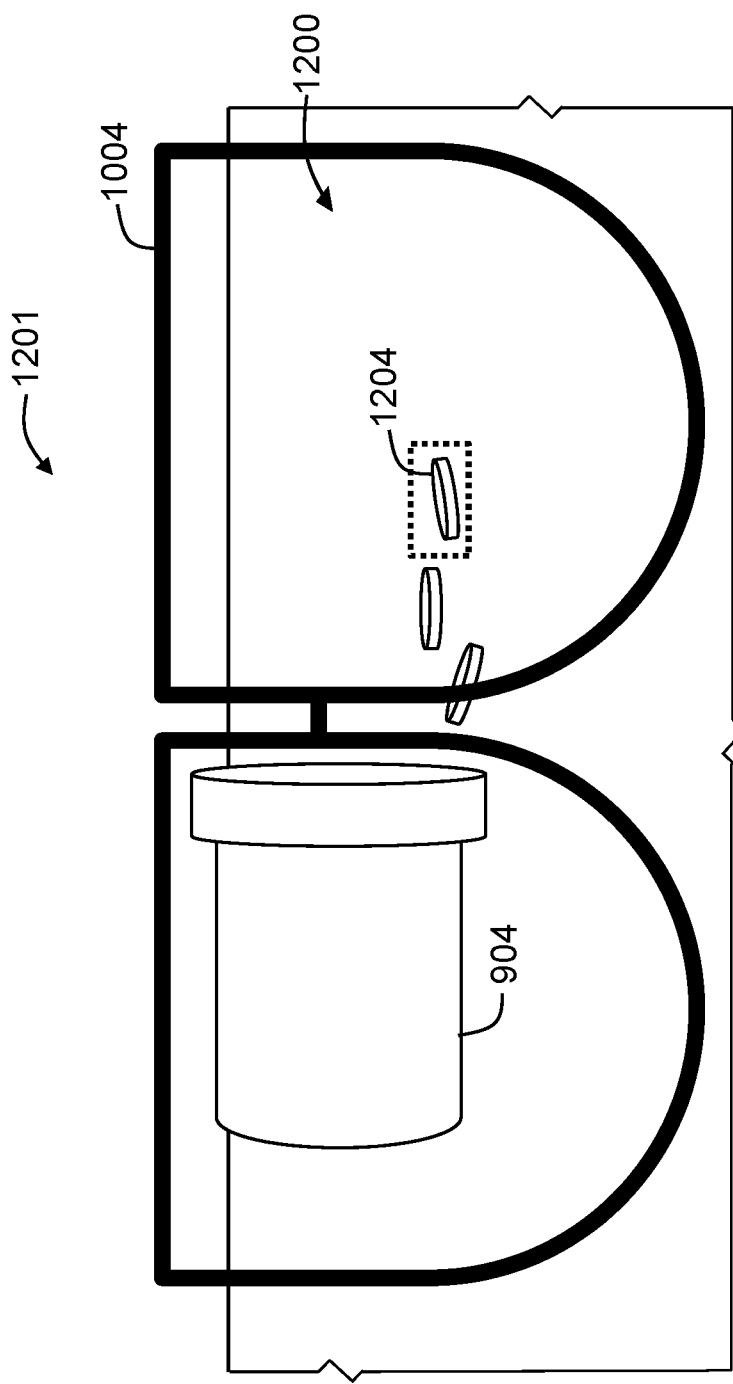
FIG. 12 depicts an exemplary alternative view of the enhanced situation visualization shown in FIG. 11 provided by the ESV computing device shown in FIG. 1.

FIG. 12 depicts an alternate enhanced situation visualization 1200 to that of FIG. 11 provided by ESV computing device 102 (shown in FIG. 1), wherein the user of user computing device 1004 has opened container 904 to expose Rx A. At least one pill, capsule, or tablet 1204 of Rx A is visible to user computing device 1004. A reference response message sent by ESV computing device 102, discussed with reference to FIG. 11, may include, in the exemplary embodiment of FIG. 12, any reference and/or situation information that may be used to identify the pill 1204 to the user of user computing device 1004 and/or to provide sufficient dosage information to the user (e.g., whether the pill 1204 is one complete dose or only half of a dose). Alternatively, a new reference request message including the user action of opening the medication container 904 and viewing the contents (e.g., a new reference request message including an image of a current view 1201) may be transmitted to ESV computing device 102, which may generate a new reference request message according to the process described herein. The new reference request message may include additional or different reference and/or situation information to provide a relevant enhanced situation visualization 1200 to the user (e.g., identify the pill 1204 to the user and/or to provide sufficient dosage information to the user, as described above).

B. Instructional Guidance

Figure 13:
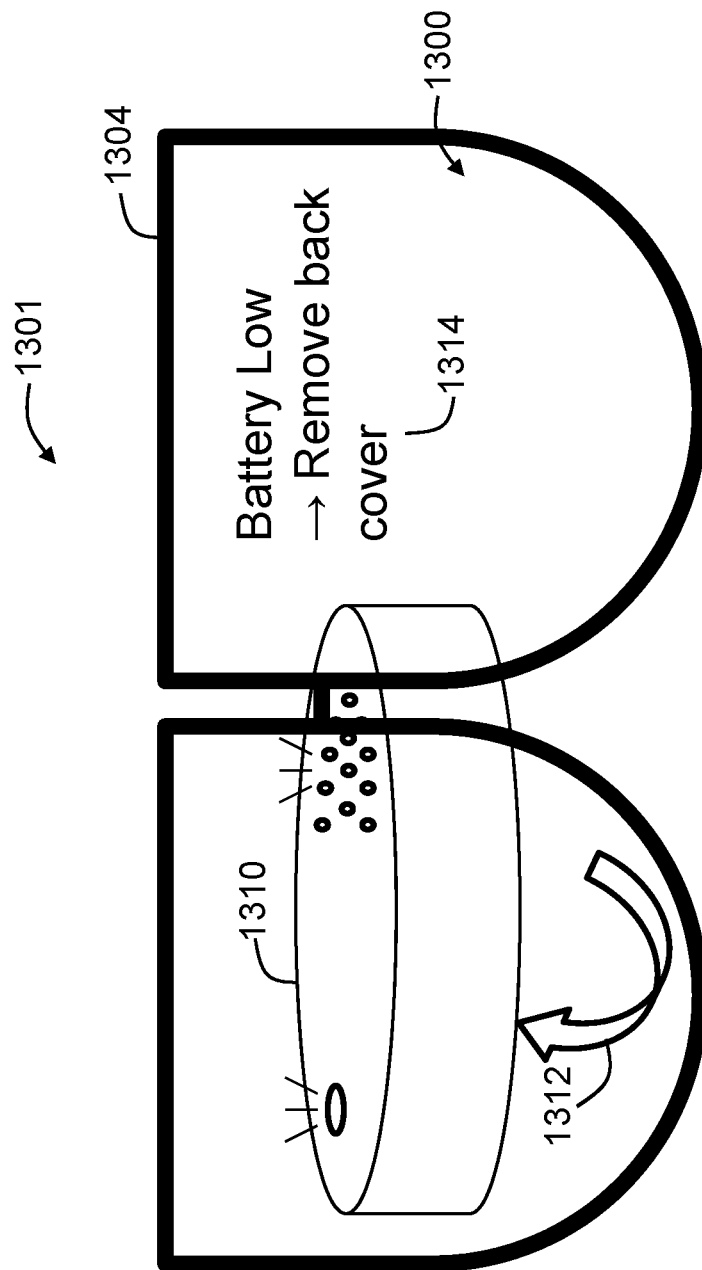
FIG. 13 illustrates another exemplary view of an enhanced situation visualization including instructional guidance provided by the ESV computing device shown in FIG. 1.

FIG. 13 depicts an enhanced situation visualization 1300 including instructional guidance, provided by ESV computing device 102 (shown in FIG. 1). The current view of the user of user computing device 1304 (also shown in FIG. 1) includes, in the example of FIG. 13, a smoke detector 1310 that is periodically emitting light and sound (e.g., a high-pitch beep). User computing device 1304 may be similar to user computing device 104 shown in FIG. 1, user computing device 404 shown in FIG. 4, user computing device 704 shown in FIG. 7, and/or user computing device 1004, shown in FIG. 10. User computing device 1304 may transmit a reference request message to ESV computing device 102 including an image of the smoke detector 1310. Additionally or alternatively, the reference request message may include a video of the smoke detector 1310 that depicts the light and the sound. Similar to the steps described with respect to FIG. 5, ESV computing device 102 may determine that the subject of the reference request message is the smoke detector 1310 using, for example, the image and/or the video. ESV computing device 102 may determine a manufacturer, model, and/or age of the smoke detector 1310. ESV computing device 102 may retrieve reference information from reference database 108 (shown in FIG. 1), wherein the reference information may include an instructional manual or troubleshooting guide for the smoke detector 1310.

ESV computing device 102 may then determine situation information using the image and/or video of the smoke detector 1310 and the instructional manual, namely that the smoke detector 1310 is emitting a "low battery" message and that the battery may be replaced by removing the back cover of the smoke detector 1310, removing the old battery, and inserting a new battery. ESV computing device 102 may compile and/or summarize the reference and/or situation information into a reference response message that is sent to user computing device 1304 to provide enhanced situation visualization 1300. In the exemplary embodiment, the information in the reference response message may be displayed graphically as an arrow 1312 and/or instructional text 1314 therein or nearby, guiding the user to examine the back of the smoke detector 1310 (in order to replace the battery, as described above). It should be understood that numerous other embodiments may be contemplated in which ESV computing device 102 may be configured to provide instructional guidance to a user of user computing device 1304.

IV. Exemplary User Computing Device

Figure 14:
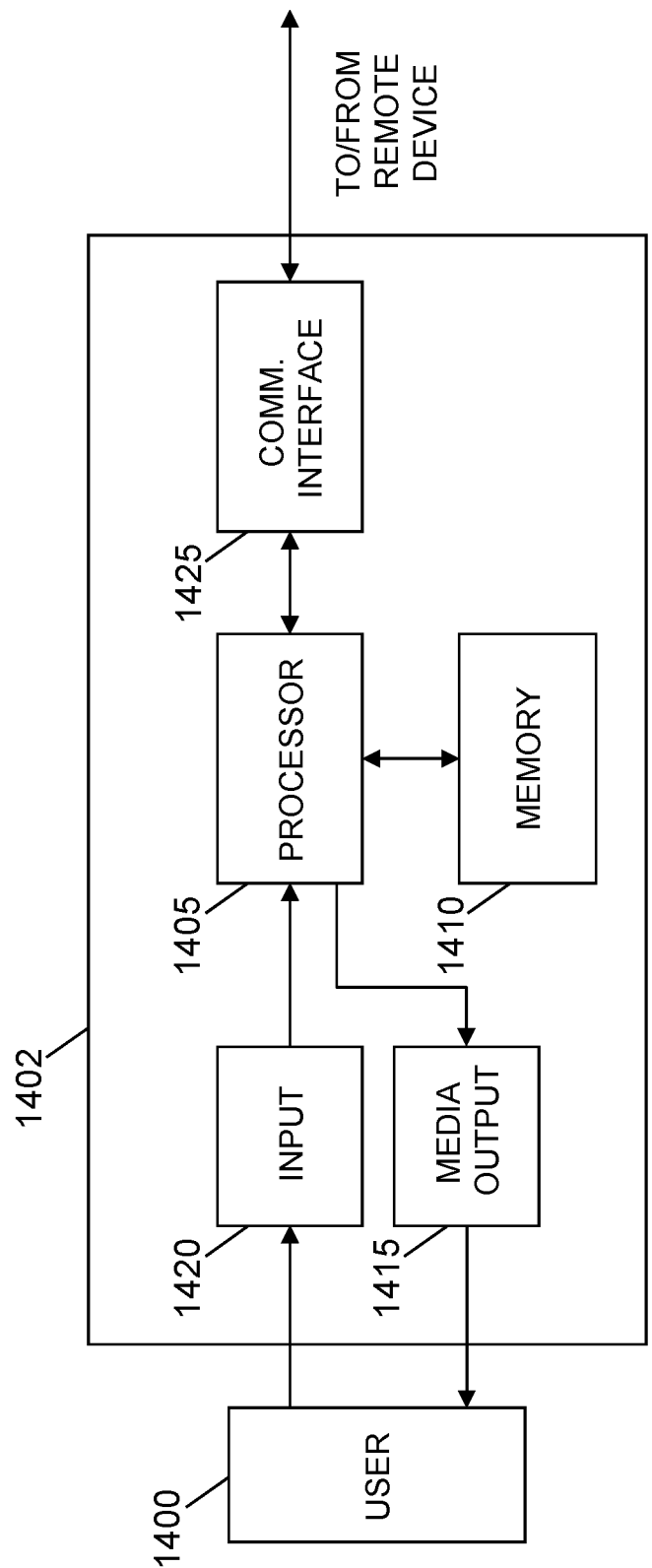
FIG. 14 illustrates an exemplary configuration of a user computing device as shown in FIG. 1, in accordance with one embodiment of the present disclosure.

FIG. 14 depicts an example configuration of a user computing device 1402. User computing device 1402 may include, but is not limited to, user computing device 104 shown in FIG. 1, user computing device 404 shown in FIG. 4, user computing device 704 shown in FIG. 7, user computing device 1004 shown in FIG. 10, and/or user computing device 1304 shown in FIG. 13.

User computing device 1402 includes a processor 1405 for executing instructions. In some embodiments, executable instructions are stored in a memory area 1410. Processor 1405 may include one or more processing units (e.g., in a multi-core configuration). Memory area 1410 may be any device allowing information such as executable instructions and/or other data to be stored and retrieved. Memory area 1410 may include one or more computer-readable media.

User computing device 1402 may also include at least one media output component 1415 for presenting information to a user 1400. Media output component 1415 may be any component capable of conveying information to user 1400. In some embodiments, media output component 1415 may include an output adapter such as a video adapter and/or an audio adapter. An output adapter is operatively coupled to processor 1405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 1415 may be configured to present an interactive user interface (e.g., a web browser or client application) to user 1400. The interactive user interface may include, for example, a reality augmentation interface for requesting and viewing enhanced situation visualization.

In some embodiments, user computing device 1402 may include an input device 1420 for receiving input from user 1400. Input device 1420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 1415 and input device 1420.

User computing device 1402 may also include a communication interface 1425, which is communicatively coupleable to a remote device such as ESV computing device 102 (shown in FIG. 1). Communication interface 1425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 1410 are, for example, computer-readable instructions for providing a user interface to user 1400 via media output component 1415 and, optionally, receiving and processing input from input device 1420. A user interface may include, among other possibilities, a web browser and client application. Web browsers enable users 1400 to display and interact with media and other information typically embedded on a web page or a website from a web server associated with a merchant. A client application allows users 1400 to interact with a server application associated with, for example, a vendor or business.

V. Exemplary Server Computing Device

Figure 15:
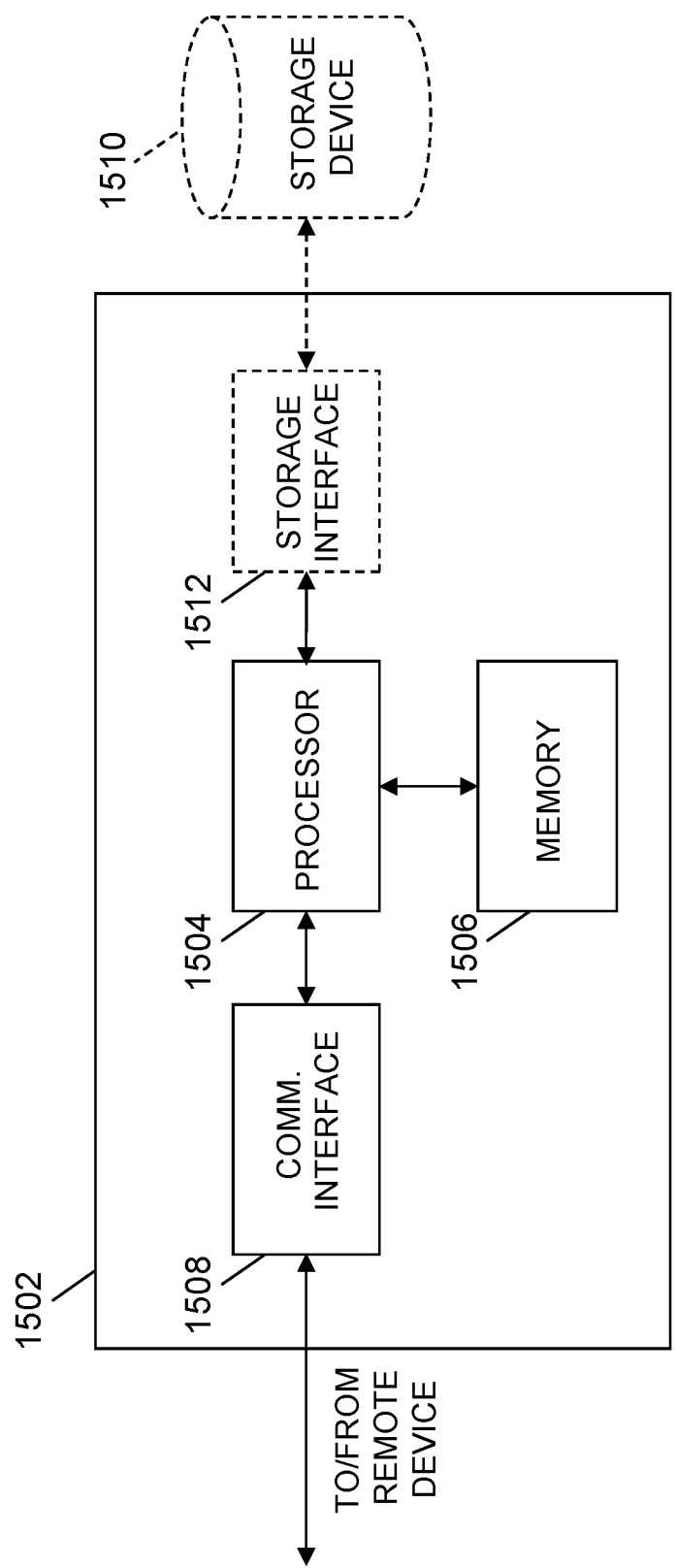
FIG. 15 illustrates an exemplary configuration of a server system as shown in FIG. 1, in accordance with one embodiment of the present disclosure.

FIG. 15 depicts an example configuration of a server computing device 1502. Server computing device 1502 may be representative of ESV computing device 102, database server 106, and/or insurance server 112 (all shown in FIG. 1). Server computing device 1502 includes a processor 1504 for executing instructions. Instructions may be stored in a memory area 1506, for example. Processor 1504 may include one or more processing units (e.g., in a multi-core configuration).

Processor 1504 is operatively coupled to a communication interface 1508 such that server computing device 1502 may be capable of communicating with a remote device such as user computing device 1402 or another server computing device 1502. For example, communication interface 1508 may receive requests from user computing device 1402 via the Internet.

Processor 1504 may also be operatively coupled to a storage device 1510. Storage device 1510 is any computer-operated hardware suitable for storing and/or retrieving data. In some embodiments, storage device 1510 may be integrated in server computing device 1502. For example, server computing device 1502 may include one or more hard disk drives as storage device 1510. In other embodiments, storage device 1510 may be external to server computing device 1502 and may be accessed by a plurality of server computing devices 1502. For example, storage device 1510 may include multiple storage units such as hard disks or solid state disks in a redundant array of inexpensive disks (RAID) configuration. Storage device 1510 may include a storage area network (SAN) and/or a network attached storage (NAS) system.

In some embodiments, processor 1504 may be operatively coupled to storage device 1510 via a storage interface 1512. Storage interface 1512 may be any component capable of providing processor 1504 with access to storage device 1510. Storage interface 1512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1504 with access to storage device 1510.

Memory areas 1410 (shown in FIG. 14) and 1506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

VI. Exemplary Computer-Implemented Methods for Enhanced Situation Visualization

Figure 16:
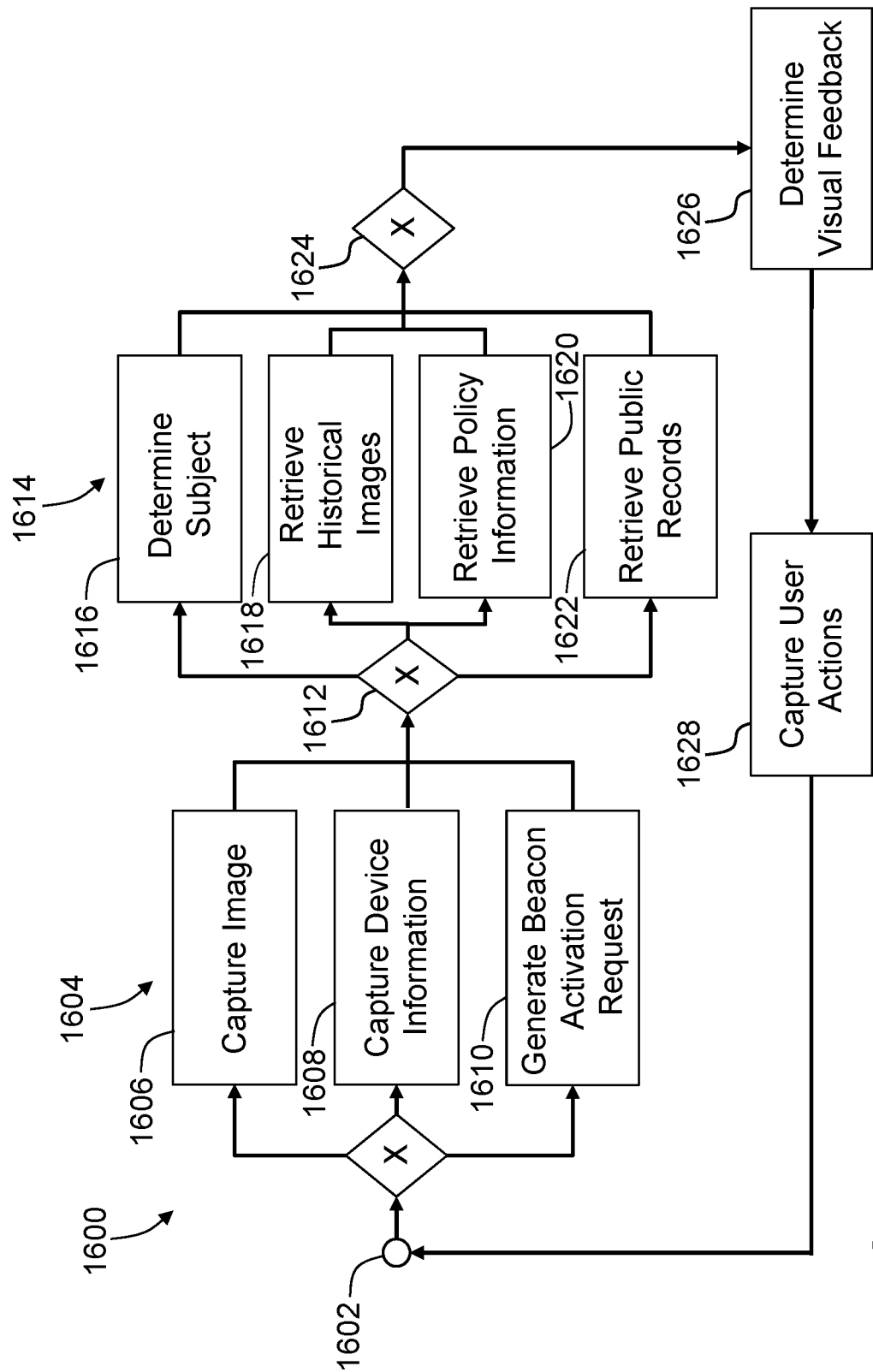
FIG. 16 illustrates exemplary enhanced situation visualization provided by the reality augmentation system shown in FIG. 1.

FIG. 16 illustrates exemplary enhanced situation visualization 1600. In the exemplary embodiment, any or all of the steps depicted may be performed by components of reality augmentation system 100 (shown in FIG. 1). The enhanced situation visualization 1600 may begin at point 1602, which may represent, in general, a user's desire for enhanced situation visualization (e.g., the user wishes to receive more information about their situation).

Group 1604 may generally represent the generation of a reference request message. The user, at user computing device 104 (shown in FIG. 1), may capture 1606 an image of their situation, representative of their current view. User computing device 104 may substantially simultaneously capture 1608 device information, which may include location information associated with the situation, the current view, and/or a subject of the current view. The user may also wish to generate 1610 a beacon activation request, should the user need to locate associated items of interest. Point 1612 may generally represent the transmission of the reference request message to ESV computing device 102 (shown in FIG. 1) and/or the receipt of the reference request message by ESV computing device 102.

Group 1614 may generally represent the generation of a reference response message. ESV computing device 102 may determine 1616 a subject of the reference request message, for example, using object recognition, device information, and any user input (e.g., the user may specify a subject of the image, or the image may include SKU data or barcode data that identifies the subject of the image). ESV computing device 102 may further retrieve 1618 historical images of the subject, and may retrieve 1620 insurance policy information for any insurance policy associated with the subject of the image. For example, if the subject of the reference request message is a property, ESV computing device 102 may retrieve a homeowner's insurance policy or renter's insurance policy, as well as any additional policies such as flood insurance or auto insurance for vehicles associated with the owner or renter of the property. ESV computing device 102 may also retrieve 1622 any public records associated with the subject (e.g., tax records, MLS listings, etc.). Point 1624 may generally represent the transmission of the reference response message and/or the receipt of the reference response message by user computing device 104.

In one exemplary embodiment, the reference response message may include instructions for user computing device 104 to display the content of the message (i.e., the enhanced situation visualization) overlaid on, beside, or instead of the current view on a display of user computing device 104. In another exemplary embodiment, user computing device 104 may determine 1626 which content to display and/or how to display the content without instruction from ESV computing device 102. User computing device 104 may subsequently capture user actions 1628 associated with the enhanced situation visualization and may transmit an indication of such user actions to ESV computing device 102, where necessary.

Figure 17:
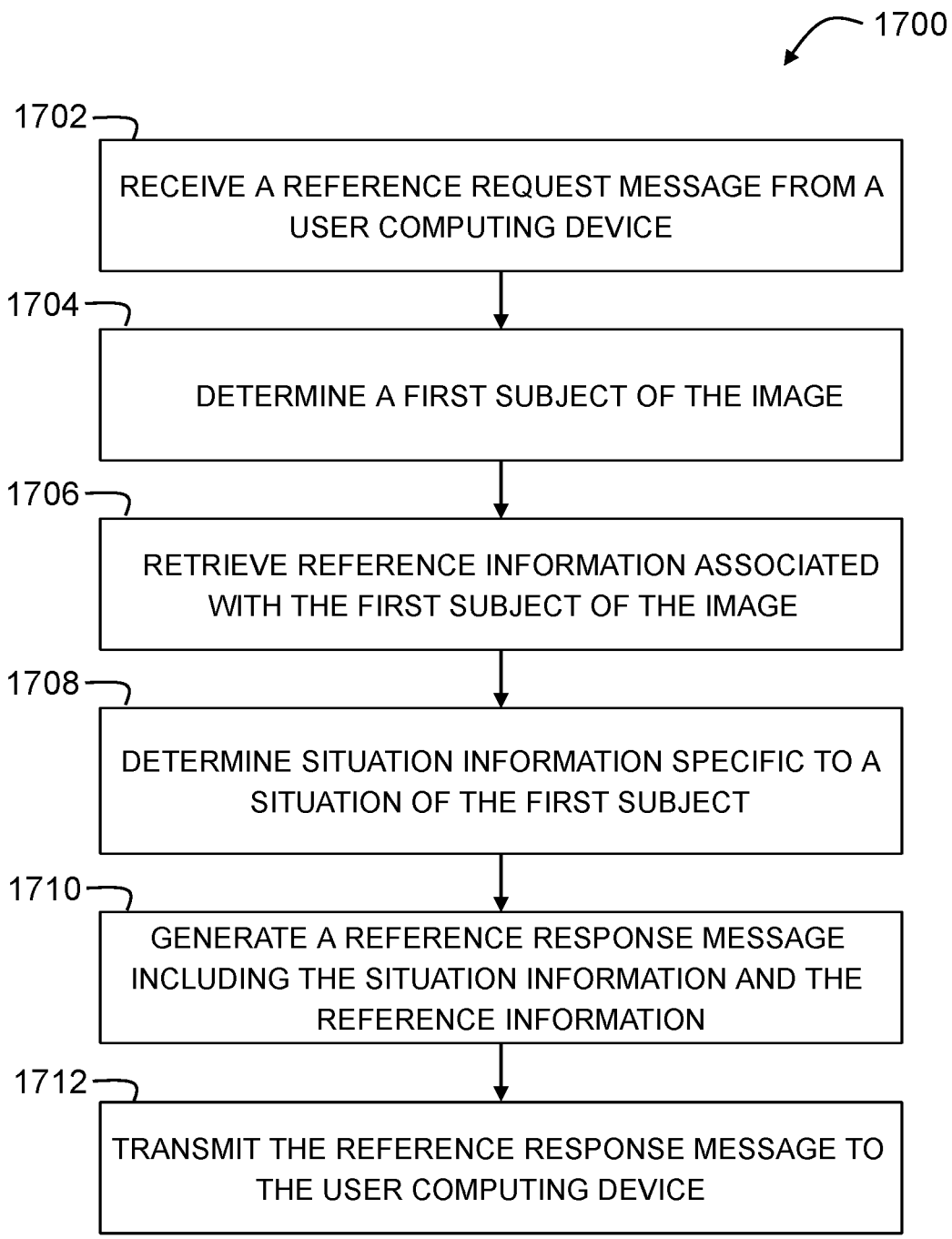
FIG. 17 illustrates a flowchart of an exemplary computer-implemented method for providing enhanced situation visualization using the reality augmentation system shown in FIG. 1.

FIG. 17 illustrates a flowchart of an exemplary computer-implemented method 1700 for providing enhanced situation visualization using reality augmentation system 100 shown in FIG. 1. In the exemplary embodiment, method 1700 may be performed by ESV computing device 102 (shown in FIG. 1). Method 1700 may include receiving 1702 a reference request message from a user computing device (e.g., user computing device 104, shown in FIG. 1). The reference request message may include an image representative of a current view of a user of the user computing device. In accordance with the various embodiments described herein, the image may include a property in a current state, a medication, and/or any other subject. The reference request message may further include a beacon activation request and/or an instructional guidance request. Method 1700 may also include determining 1704 a first subject of the image. In accordance with the various embodiments described herein, the subject may be the property, the medication, and/or any other subject.

Method 1700 may further include retrieving 1706 reference information associated with the first subject of the image. The reference information may be retrieved 1706 from a reference database (e.g., reference database 108, shown in FIG. 1). In accordance with the various embodiments described herein, the reference information may include a historical image of the property in a prior state, a medication schedule associated with the medication and with the user, an instructional guide, and/or any other reference information as discussed elsewhere herein.

In addition, method 1700 may include determining 1708 situation information specific to a situation of the first subject. The situation information may be determined 1708 based upon the reference request message and the reference information. In accordance with the various embodiments described herein, the situation information may include at least one difference between the prior state and the current state of the property, a status indicator indicating whether the user has complied with the medication schedule, a schedule alert to remind the user to take the medication at a time including in the medication schedule, a status of the first subject, a first instruction based upon the status of the first subject and the instructional guide, and/or any other situation information as discussed elsewhere herein. Method 1700 may also include generating a reference response message including the situation information and the reference information.

Method 1700 may further include transmitting 1712 the reference response message to the user computing device. The reference response message may cause at least one of the situation information and the reference information to be displayed on the user computing device as overlaid upon the current view of the user to provide an enhanced situation visualization to the user. Method 1700 may include additional, less, or alternate actions, including those discussed elsewhere herein.

VII. Exemplary Computing Device for Enhanced Situation Visualization

Figure 18:
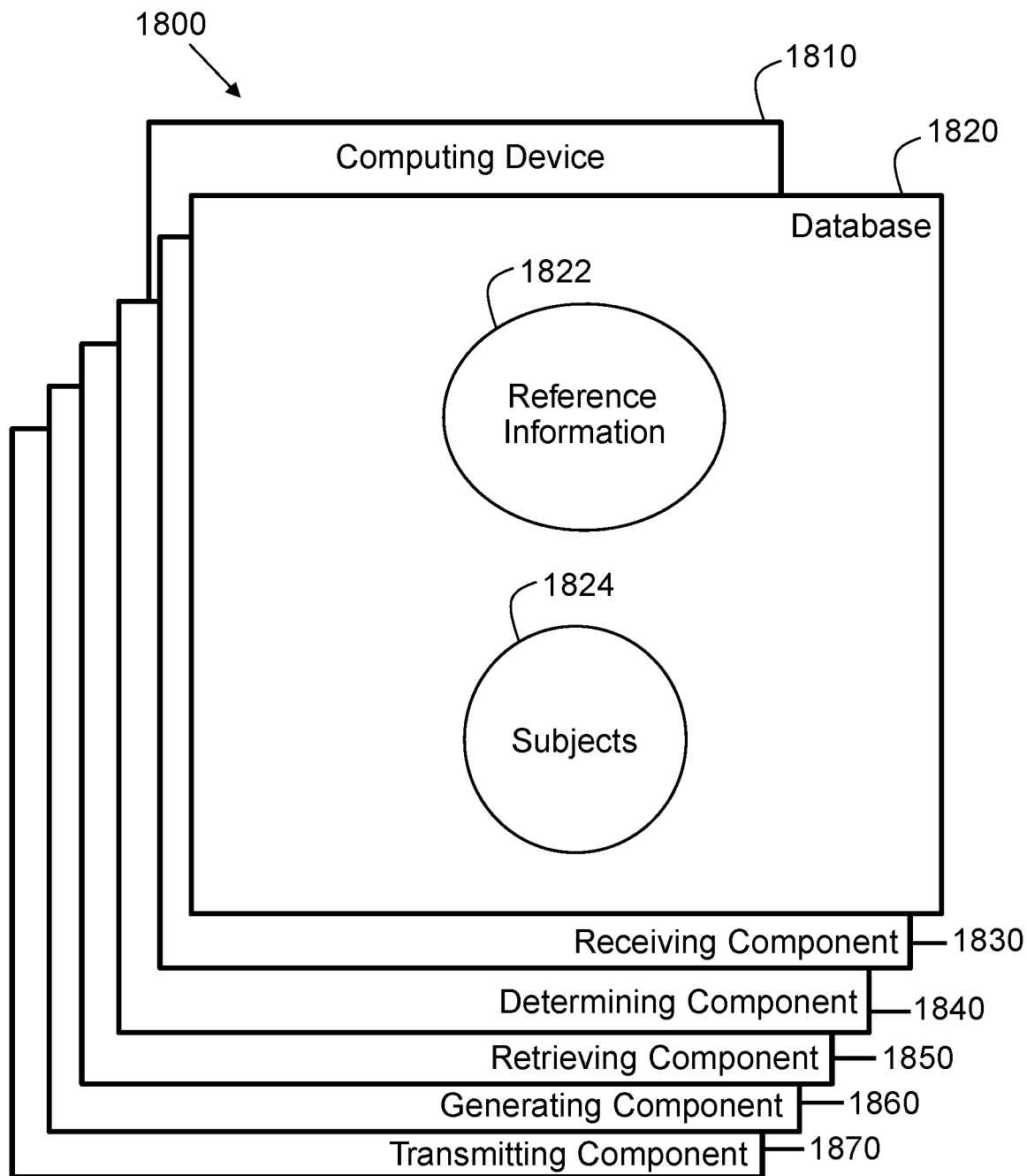
FIG. 18 depicts a diagram of components of one or more exemplary computing devices that may be used in the system shown in FIG. 1.

FIG. 18 depicts a diagram 1800 of components of one or more example computing devices 1810, for example ESV computing device 102 (shown in FIG. 1), that may be used in embodiments of the described systems and methods. FIG. 18 further shows a configuration of data in database 1820, which may be similar to database 108 (also shown in FIG. 1). Database 1820 may include, for example, reference information 1822 associated with one of more subjects 1824, and other data as described elsewhere herein. Database 1820 may be in communication with several separate components within computing device 1810, which perform specific tasks.

More specifically, computing device 1810 may include a receiving component 1830, which may be configured to receive a reference request message from a user computing device (e.g., user computing device 104, shown in FIG. 1). The reference request message may include an image representative of a current view of a user of the user computing device. Computing device 1810 may also include a determining component 1840, which may be configured to determine a first subject 1824 of the image. Additionally, determining component 1840 may be further configured to determine situation information specific to a situation of the first subject 1824, based upon the reference request message and reference information 1822. A retrieving component 1850 may be configured to retrieve reference information 1822 associated with the determined first subject 1824. Retrieving component 1850 may retrieve reference information 1822 from database 1820 and/or any other memory device.

Computing device 1810 may further include a generating component 1860, which may be configured to generate a reference response message including the situation information and the reference information 1822. Computing device 1810 may still further include a transmitting component 1870, which may configured to transmit the reference response message to the user computing device.

VIII. Exemplary Insurance-Related Functionality

As noted herein, the present embodiments may relate to collecting, generating, providing, and/or displaying information associated with an insurance-related event (such as damage to a property due to a natural disaster, home fire, or other incident) via a reality augmentation system 100, as shown in FIG. 1. Information related to a current state of a subject, such as the damaged property, may be collected by a user computing device 104 (also shown in FIG. 1). For example, user computing device 104 may capture an image of the property in a (current) damaged state. The image may be stored locally on memory 1410 of user computing device 104 (shown in FIG. 14) and/or transmitted to insurance server 112, ESV computing device 102, (both shown in FIG. 1) and/or to an external database for storage and/or analysis.

In particular, ESV computing device 102 may perform analysis of the image to determine that the subject of the image is the damaged property. The image may be analyzed using, for example, object recognition (OR) or other computing techniques. ESV computing device 102 may further generate situation information unique to the situation provided by user computing device 104. More specifically, ESV computing device 102 may compare the current state of the property to a previous (i.e., undamaged) state. Such situation information may facilitate, or be used to, (i) determine, catalog, characterize, or quality an extent, severity, and/or nature of the damage to the property; (ii) prepare or populate a claims form associated with the damage to the property; (iii) determine whether there is any additional potential for damage or injury (e.g., whether there is a downed power line); (iv) avoid unnecessary and/or inaccurate claims; and/or other insurance-related purposes or activities.

In one aspect, ESV computing device 102 may be programmed to identify any damaged areas of the property in the image to populate and/or adjust a claims form associated with the property. Additionally, ESV computing device 102 may be programmed to identify any missing features, elements, and/or aspects of the image such that the missing features, elements, and/or aspects may be located (e.g., by debris removal or using beacon information) or the loss may be added to an existing claims form or loss report.

In accordance with one exemplary embodiment, an insurance server (e.g., insurance server 112) may be provided. The insurance server may include at least one processor and may be in communication with a database. The at least one processor may be configured to store a claims form, wherein the claims form includes at least one fillable field associated with an insurance claims. The at least one processor may also be configured to receive a reference response message generated at an enhanced situation visualization computing device (e.g. ESV computing device 102). The reference response message may identify a property in a current state, and may include reference information associated with the property and situation information associated with the current state of the property. The situation information may include at least one difference between the current state of the property and a prior state of the property. The at least one processor may be further configured to identify an insurance policy associated with the property, and populate the at least one field of the claims form with at least one of the reference information and the situation information. The populated claims form may be used to update and/or adjust the insurance policy associated with the property.

IX. Additional Exemplary Computer-Implemented Methods

In one aspect, a computer-based method for updating an insurance policy based upon an enhanced situation visualization (ESV) on a user interface of a user computing device may be provided. The method may include storing, by an insurance server at a database, a claims form, wherein the claims form includes at least one fillable field associated with an insurance claim. The method may further include receiving, by the insurance server, an ESV from a user computing device, wherein the ESV identifies at least one difference between a current state of a property and a prior state of the property. In addition, the method may include identifying, by the insurance server, an insurance policy associated with the property, and populating, by the insurance server, the at least one field of the claims form based upon the at least one difference. The method may also include updating and/or adjusting, by the insurance server at the database, the insurance policy based upon the populated claims form.

X. Exemplary Insurance Applications

The chaotic situation following a significant natural disaster event (hurricane, wildfire, storm surge, etc.) may involve many difficulties for property owners, local governments, insurance companies and other interested parties. Displacement of objects, piles of debris, inaccessible or damaged infrastructure services, mixture of property belonging to multiple owners, and other factors increase the time, expense and frustration of all affected parties in an already traumatic situation. The lack of ready-at-hand historical images may exacerbate these problems. Similar in effect, though differing in cause, is the situation faced by those experiencing memory loss and cognitive impairments. The ability of those individuals to live unassisted in their own homes is significantly reduced by the chaos of previously familiar objects and tasks presenting themselves on a daily basis.

The present embodiments involve the use of historical image data (video, still image, 3D mapping), object recognition technology, location awareness technology, and personal digital projection apparatuses (e.g. Google Glass, Meta Pro, Magic Leap, GlassUp, Optinvent Ora-S AR, Vuzix Smart Glasses, etc.), supplemented by augmented reality information in order to produce visualizations that facilitate user action in chaotic or unfamiliar situations. These technologies will be collectively referred to below as "glasses," though the same results could be achieved through a smartphone, tablet, or other computer that has embedded camera and screen technology.

For claims adjusters, historical images of a pre-disaster property (or set of properties) could be displayed to a user for comparison purposes on their glasses. Historical images may be drawn from existing public image data, per location (e.g., Google Maps "street view", TomTom satellite-based 3D mapping) or from company-owned image data related to the property. The historical images may be supplemented with visual indicators to highlight significant changes between the historical view and the current view of a property. Where only a limited number of images are available, the glasses may indicate the correct location from which the image comparison may be made by the user. In areas with greater image availability, the glasses could use location and directional data to generate equivalent visualizations of a property, regardless of viewing angle, by correlating location and directional data from stored images. Customer contact information, policy provisions and limits, and material depreciation (based upon object recognition and/or standard calculations) may also be displayed as an overlaying image on the glasses in a claims scenario, making conversations and decisions more informed and prompt. The same apparatus may be used to recognize, measure, and evaluate roofing materials and damage to them.

The same apparatus could also show a virtual grid overlay of pre-damage images of structures, highlighting the changes incurred, and using object recognition and spatial mapping technologies to establish the nature of the materials damaged, their approximate size (square footage, etc.) and the approximate cost of repair or replacement (by referring to established tables of such data—i.e., per square foot replacement cost for average quality vinyl siding). These numbers may be captured and stored, being compiled together as part of a claim disbursement estimate. The visual grid (constructed from historical images of a property and/or satellite-based 3D mapping) may be used to establish spatial relationships between multiple badly-damaged structures (for example, those that have collapsed into one another).

The same underlying apparatus and set of applications may be used by field underwriters surveying a property to ensure proper coverages and replacement costs. The creation dates of historical images of a property could be compared to coverage effective dates, to correlate property conditions to policy periods—as well as to judge the changes in the property over time (i.e., if multiple historical images are available). In this use, the process may be further extended to include existing policy information (e.g., coverage amounts, deductibles, estimated replacement amounts), so that any changes in the underlying property could be used as the basis for answering specific business questions (e.g., changes in eligibility based upon additions to a home, changes in coverage needs and premium resulting from home improvements, changes in data elements such as Roof Age when updates as detected). These required/recommended policy changes may be communicated to the user of the glasses, enabling them to immediately communicate those to customers or other interested parties. The user of the glasses may use the same apparatus to initiate those policy changes and/or prepare a communication that invites the customer and/or their agent to complete the work necessary to make those policy changes.

Public record and non-image historical company data on a property (on-hand statistics) may also be displayed on the glasses and made available to field underwriting for more convenient comparisons (with differences between recorded data and newly-seen images being flagged or otherwise highlight—e.g., a previously reported square footage that no longer matches the glasses-detected square footage, because of a new addition to the property).

In combination with beacon/Internet of Things (IoT) technology, such an apparatus may be used to facilitate recovery of important objects obscured by debris, moved from their original location by wind or water, or otherwise lost. The augmented reality function of the apparatuses mentioned above may be used to visually highlight the location of objects and provide information (name of object, direction, distance). This information may be based upon a correlation of beacon information with specific contents pre-arranged as "key objects" in a household contents catalog (e.g., car keys, fire-proof document boxes, etc.).

Private individuals could take advantage of the same underlying technology and process to locate specific objects in or around their property, outside of the context of a loss event. For example, individuals suffering from impairments to memory and/or cognition could be guided through their own home by an augmented reality enhanced set of glasses that enables the location of lost objects, and assistance with the use of important objects (e.g., prescription drugs). The glasses may visually highlight and provide stock information about objects, based upon object recognition, pre-set criteria and metadata related to important objects (example: assistance in locating prescription medicine, and dosage instructions once the object is located). The glasses may further be employed to give process directions and reminders, in conjunction with the augmented reality visuals (example: reminding someone that it is time to take out the trash, and then, if desired, giving directions for the sequential performance of the steps needed for completing the task).

Private individuals may also be provided with simulations of critical maintenance activities in their home or business. For example, based upon object recognition, water valves, circuit breakers, gas valves and other critical mechanical interfaces may be identified, and when identified, simulations of their use could be displayed on the smart glasses, showing the action a user could take in the event of a mechanical failure or weather event. For example, a simulation of locating and turning on a supplemental generator may be provided via smart glasses when a power loss is experienced.

The present embodiments may include (i) the combinative use of personal digital projection apparatuses ("smart glasses") and augmented reality technology in the context of insurance industry operations; (ii) the correlation of historical visual (video, still images, 3D mapping) data with current images, seen "live" through smart glasses, smartphones, tablets, and other computer technologies; (iii) the combination of technologies necessary for enhanced object location services, in the context of insured property (e.g., Claims) and independent living assistance; and/or (iv) the use of beacon and/or Internet of Things (IoT) technology in the context of insurance-specific processes, such as Claims Adjustment and Underwriting Surveys.

The present embodiment may also (v) enable claims adjusters to provide better, faster service in existing capacity, and allowing them to fulfill new services on behalf of customers (i.e., assisting individual locate key objects that would be counted as part of a total loss otherwise); (vi) reduce catastrophic claims handling time service; (vii) reduce overall claims (i.e., from total loss to partial loss, when key objects may be located and recovered, or when just-in-time simulations and alerts are provided to property owners in order to minimize the extent of a loss); (viii) offer new loss recovery services (in catastrophic loss event and theft situations), particularly for property such as watercraft; (ix) offer a unique and valuable service that improves the claims experience (e.g., for purposes of customer retention); (x) allowing more accurate and expedited re-inspection of properties, including allowing for analysis of differences at the beginning of the process (i.e., when data are captured, rather than after data are delivered into analysis systems after the fact); (xi) reduce the time between re-inspections and coverage/premium adjustments; (xii) enable customers to live longer in their own homes without assistance (or minimizing such assistance); and/or (xiii) offer a software application for smart glasses or smartphone for sale to the public (i.e., to homeowners or realtors) that may help them assess the condition of a home, its maintenance needs; as well as to individuals (and caretakers) who need partial assistance in order to maintain independent living.

XI. Additional Insurance-Based Applications

The natural risks inherent in a given property may be difficult to visualize and understand—both by insurance customer and associates (whether in sales or underwriting). Understanding risk is paramount in the business of insurance, as well as other property-related decision making. A greater understanding of risks posed by natural conditions, hypothetical events, and trends may increase confidence in both situations.

Location-based systematic peril mapping and in-person (and virtual) inspections (aka underwriting surveys) of real property may help to give point-in-time view of the underwriting concerns and risks of natural disasters occurring in a given location, with relation to that property. For example, an in-person observation of landslide activity may give an insurance carrier pause when it comes to writing business for a particular property. Additionally, certain peril mapping values may be avoided for whole sets of properties in given locales (for example, those that may be likely to experience hurricane and storm surge activity).

The present embodiments may involve the use of peril mapping data, object recognition technology, location awareness technology, and/or video/screen-enabled computing devices (whether "smart" glasses, smartphones, or others), supplemented by augmented reality information in order to produce simulations of the effects of various natural phenomena on selected properties.

In one embodiment, existing two-dimensional peril maps may be correlated to topographical data (e.g. elevation values) to produce an augmented reality overlay of simulated water levels, simulated wildfire paths, and other natural disasters. Object recognition and location awareness may be used to correlate mapping data to particular topography and insured objects (for example, showing where a hypothetical flood could touch a property, or where a wildfire under certain wind conditions may touch a property).

In the example of wildfire, object recognition may be used to establish more accurate wildfire setback areas (as opposed to peril map-based setbacks). Object recognition may also be used to validate existing topographical maps (for example, following a recent earth movement event or the growth of brush since the most recent aerial imagery was captured), allowing for disaster simulations based upon actual topography instead of the mapped topography.

Simulations may be produced based upon factors such as a user-selected disaster type, severity, and duration. The simulation may be as simple as a visual overlay of a line representing a projected water level, given the selected input, or as complex as simulated property damage animations (discoloration to show water damage, destruction of a detached structure in a fire, movement of a building down a slope in an earthquake, etc.).

Existing insurance policy information may be used as the basis for estimations of damage to a particular property. For example, if a flood simulation showed water levels that would damage a basement and a detached structure, the value (or percentage of total value) of those structures could be displayed to the user, relative to the estimated severity and duration of the disaster (i.e. water levels high enough to flood a basement would not necessarily result in a total loss, but they might result in a total loss for a detached structure that is submerged or washed away).

In a further enhancement, the input may be gathered in a reverse direction, such that a risk tolerance (e.g., on the part of the insurance customer or the insurance provider) may be established first, and simulations could be run to determine the level of severity, duration and extent that could occur and remain under that risk tolerance threshold. For example, if a given Customer decided that flooding of basements would be acceptable, but flooding of 1st floors would not, simulations may be run to determine the severity of weather events that could occur that would cause the first, but not the second, type of damage.

The present embodiments may include (1) the use of augmented reality technology to produce disaster simulations in the context of insurance; and/or (2) the mapping of peril maps to video capture images on smartphones and smart glasses. Potential application and/or uses of the present embodiments may include (i) enabling agents and/or underwriters to better understand and communicate the natural risk inherent in a particular property (e.g., by visualizing for a homeowner their need for increased coverage related to a particular natural hazard); (ii) enabling better underwriting decision making (i.e., on the spot, instead of using abstract peril maps only); (iii) enabling consumers and realtors to make decisions about prospective property purchases, with respect to natural hazard risks; and/or (iv) enabling consumers to assess their own insurance risks, including their tolerance for risk and possible preventative mitigation efforts that could be taken (for example, as a free application on a smartphone that could simulate the effects of different wildfire setbacks/defensible space, suggesting the right distance to be maintained between the house and surrounding brush areas).

Figure 19A:
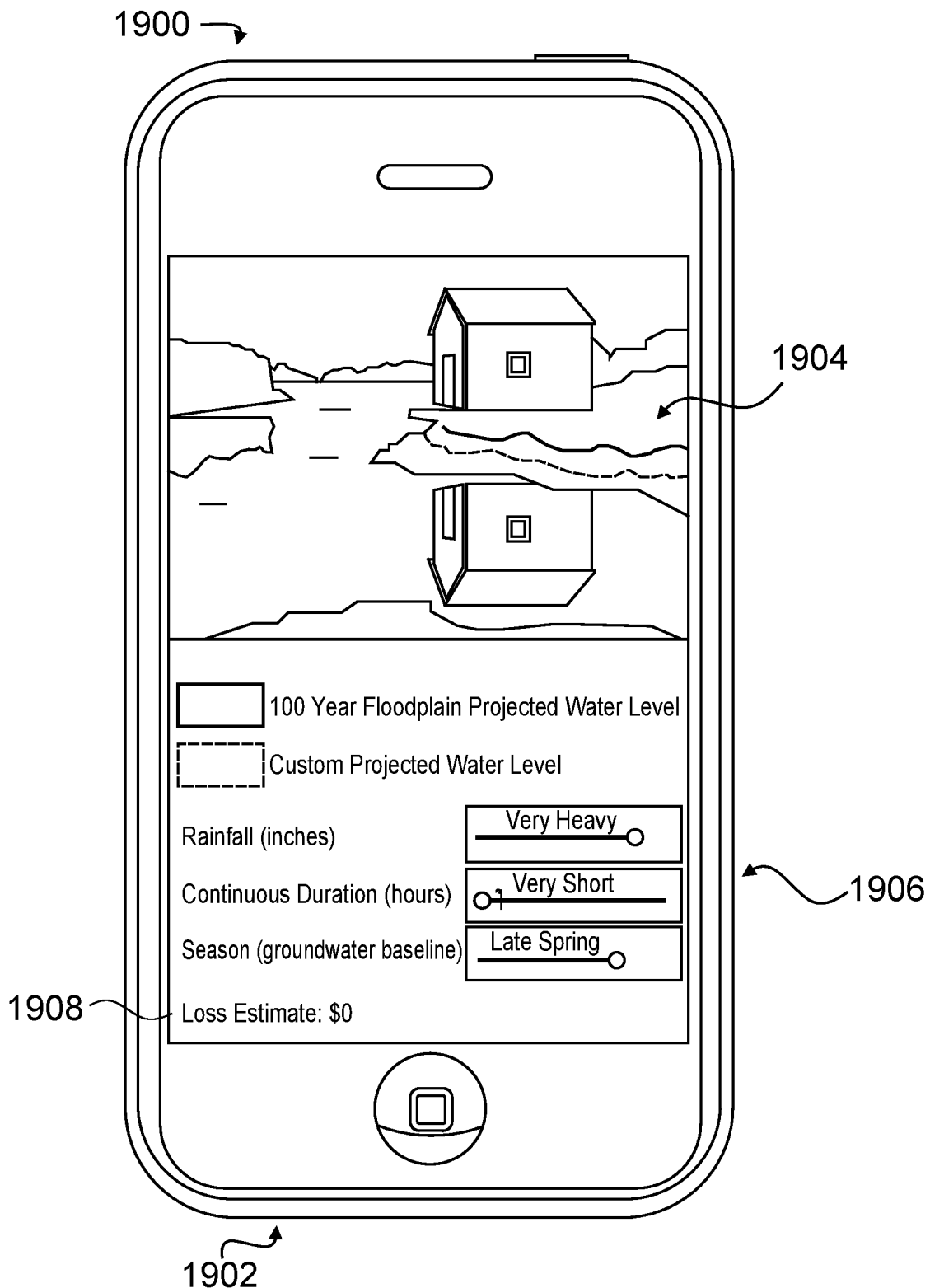
FIGS. 19A and 19B illustrate an exemplary floodplain simulation depicting a customized projected water level and an estimation of the severity of losses due to rising water.
Figure 19B:
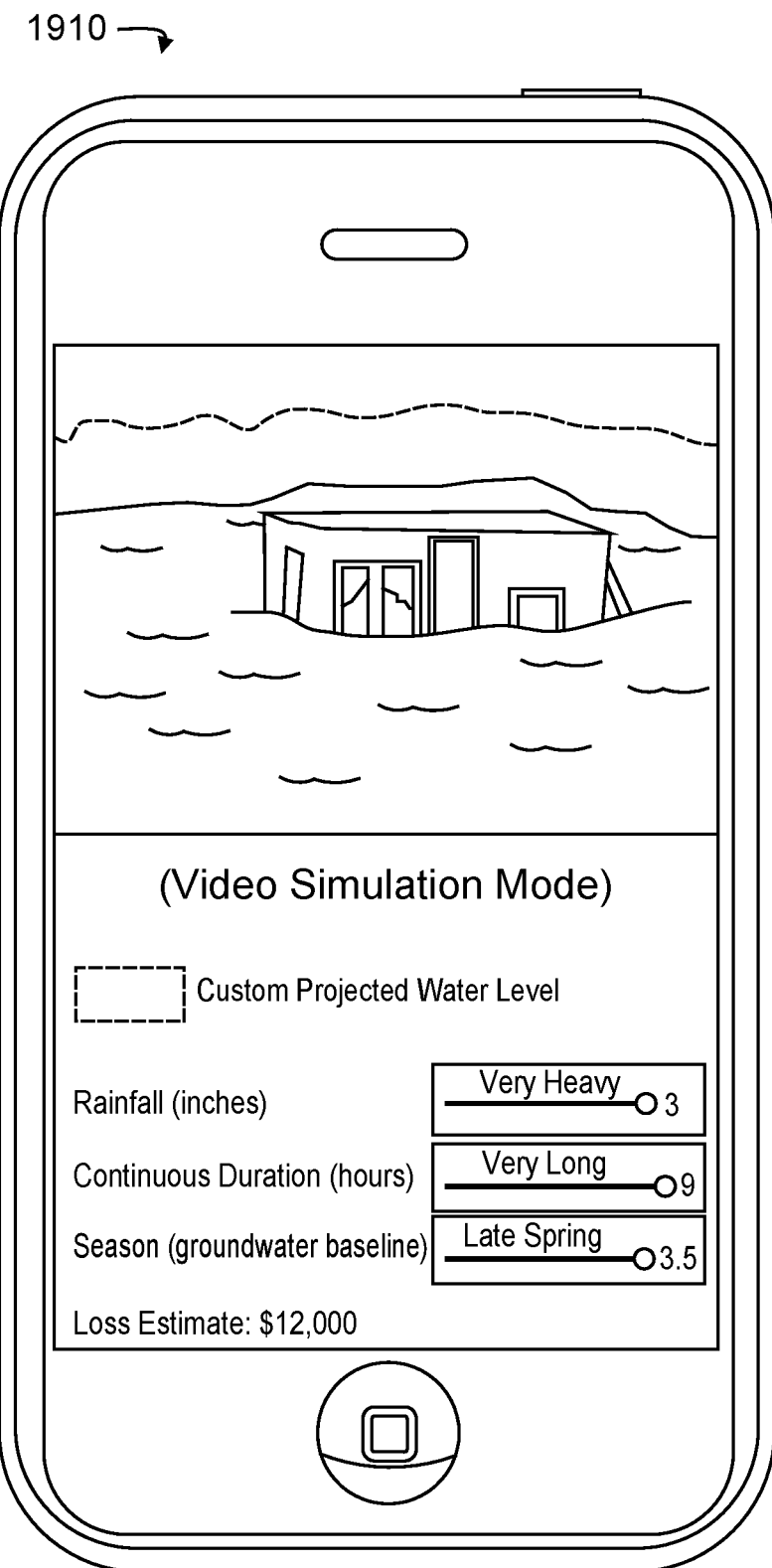

FIGS. 19A and 19B illustrate an exemplary floodplain simulation 1900. The floodplain simulation may be implemented, for instance, a mobile device, a mobile device application, a website accessible via the mobile device via wireless communication or data transmission, and/or other processors, or computer-executable instructions stored on non-transitory computer readable medium or media. The floodplain simulation may utilize virtual topographical floodplain mapping transposed onto 3D (three dimensional), or even 2 dimensional) video capture. The mobile device app (and/or other computer instructions) may include customizable variables for simulation input. As shown in floodplain simulation 1902, the variables may include rainfall in inches 1906; a continuous duration, such as in hours; and/or a seasonal factor (such as a groundwater baseline). Additional, less, or alternate variables may be used.

For instance, as shown in floodplain simulation 1902, an estimation of the severity of losses 1908 may be calculated and displayed. The severity of losses 1902 may be estimated based upon insurance policy information, such as a value of an insured object or home multiplied by the percentage of the object or home that is subject to damage.

The floodplain simulation 1902 may include augmented reality visualization and/or may use video capture-overlay. For instance, a customized projected water level 1904 may be displayed, such as by displaying an icon or series of icon on top of video images, such as on top of images of a rising riving. The project water level 1904 may be estimated based upon the customized input variables mentioned herein, or upon other weather-related or water-related variables.

The floodplain simulation 1900 mobile device app may also include an animated floodplain simulation 1910. The animated floodplain simulation 1910 may include augmented reality visualization, use image capture-overlay and animated simulation of catastrophe. The animated floodplain simulation 1910 may include a customized projected water level and display a loss estimate. The animated floodplain simulation 1910 may display additional information, including that discussed elsewhere herein.

The floodplain simulation 1900 may be mapping information, GPS information, OR (object recognition) and/or OCR (optical character recognition techniques) to generate a virtual simulation to simulate what may happen during a natural disaster and facilitate identify and mitigating risks. For instance, during a flood, a mobile device app may gather floodplain information, using geo-location data, and/or accept user adjusted input parameters to run a virtual simulation and determine consequences, including insurance-related consequences, of an event. The user may adjust parameters associated with adjusting rainfall, wind speed, hail amount, storm surge, soil saturation, length of a rain event.

Virtual dotted lines may be superimposed on top of video images of a river at a projected flood level. As a result, a peril map may be created based upon the GPS latitude/longitude coordinates to overcome inaccuracies with old topographical maps. Flooding, storm surge, wild fire zones, distances to shorelines, earthquake or tornado boundary maps, and other dangers, or the extent thereof, may be virtually simulated.

The virtual simulation may identify a house on the side of a river bank, determine whether the house is above or below a current (or even projected) water line, and/or estimate how much damage to the home has been caused by the flooding.

The virtual simulation may identify a house in a wild fire zone, determine whether trees/shrubs in the yard or otherwise near the house pose an added risk to the house due to the wild fire conditions. An insurance discount may be offered to the customer via the mobile device if they cut back shrubbery or trees endangering the house due to the wild fire.

XII. Exemplary Methods and Simulations

In one aspect, a computer-implemented method of natural disaster simulation may be provided. The method may include (1) capturing video or images of an insured property via a mobile device camera, and GPS coordinates from a mobile device GPS unit; (2) determining an extent (such as a predicted future or past extent) of a natural disaster (or other causes of damage to the property, such as wear and tear, age, weather, usage, etc.) at a location of the insured property based upon computer analysis of (i) the video or images, (ii) GPS coordinates, and/or (iii) weather data via a local or remote processor, such as the mobile device processor or a remote server associated with an insurance provider; (3) determining a graphic (e.g., one or more icons) virtually representing an extent of the natural disaster at the location of the insured property via the local or remote processor; and/or (4) superimposing the graphic virtually representing the extent of the natural disaster on the video or images of the insured property to visually depict whether the insured property is at risk, or has incurred damage, due to the natural disaster and facilitate mitigating or preventive measures that lessen or prevent damage to the insured property caused by the natural disaster. The method may include additional, less, or alternate actions, including those discussed elsewhere herein, and/or implemented via one or more local or remote processors, and/or computer-executable instructions stored on non-transitory computer media or medium.

For instance, the mitigating or preventive measure may involve removing personal belongings from the insured property prior to the natural disaster causing damage. The mitigating or preventive measure may involve adding sandbags around the insured property if the graphic indicates that the insured property is at risk of damage caused by the natural disaster, the natural disaster being a flood or water-related. The mitigating or preventive measure may involve cutting/removing shrubbery or trees around the insured property if the graphic indicates that the insured property is at risk of damage caused by the natural disaster, the natural disaster being a wild fire or fire-related.

The method may include generating insurance-related recommendations for display on the mobile device display if the graphic indicates that the insured property is at risk of damage caused by the natural disaster, the natural disaster being a flood or wild fire. The method may include adjusting insurance premiums or discount based upon the extent of the natural disaster estimated, and/or an insurance customer taking or preforming the insurance-related recommendations if the graphic indicates that the insured property is at risk of damage caused by the natural disaster, the natural disaster being a flood or wild fire.

Determining the extent (such as a predicted future or past extent) of the natural disaster at the location of the insured property may be based upon computer analysis of (i) the video or images taken by the mobile device, (ii) GPS coordinates generated by the mobile device GPS unit, (iii) weather data, including water maps, rain amounts, wind speed and direction, and/or weather forecasts and radar information, and/or (iv) topographical or other map information. Additionally or alternatively, the graphic depicting the extent of the natural disaster may be computed using various variables, including amount of rainfall based upon the GPS information, continuous duration of rain, and/or groundwater amount.

In another aspect, a computer-implemented method of natural disaster simulation may be provided. The method may include (1) determining, via one or more processors (such as a mobile device or remote server processor) an extent of a natural disaster, such as a future or past extent of an ongoing natural disaster at a specific location (such as a GPS location associated with the mobile device and/or images/video acquired by the mobile device); (2) generating a graphic, via the one or more processors, virtually representing the extent of the natural disaster at the specific location; and/or (3) displaying, via the one or more processors, the graphic on top of still images or video of the specific location taken by the mobile device, the still images or video including images of an insured property, and the graphic depicting whether or not the insured property is at risk of damage due to the natural disaster, or has incurred damage caused by the natural disaster to facilitate taking preventive or mitigating actions and/or providing insurance-related recommendations to an insurance customer via their mobile device.

The method may include additional, less, or alternate actions, including those discussed elsewhere herein, and/or implemented via one or more local or remote processors, and/or computer-executable instructions stored on non-transitory computer media or medium. For instance, the one or more processors may use the extent of the natural disaster calculated to estimate damage to an insured property, and/or may handle or adjust an insurance claim covering the insured property using the estimated damage. In one embodiment, the natural disaster may be a flood or wild fire, and/or the damage to the insured property may be water or fire damage.

XIII. Exemplary Systems for Disaster Simulation

In one aspect, a computer system or mobile device configured for natural disaster simulation may be provided. The computer system or mobile device may include a one or more local or remote processors configured to: (1) capture video or images of an insured property via a mobile device camera (and/or the one or more local or remote processors), and GPS coordinates from a mobile device GPS unit or nearby GPS units (such as a house smart controller); (2) determine an extent (such as a predicted future or past extent) of a natural disaster at a location of the insured property based upon computer analysis by the one or more local or remote processors of (i) the video or images, (ii) GPS coordinates, and/or (iii) weather data, such as via the mobile device processor or a remote server associated with an insurance provider; (3) determine or generate a graphic (e.g., one or more icons) virtually representing an extent of the natural disaster at the location of the insured property via the one or more local or remote processors; and/or (4) superimpose the graphic virtually representing the extent of the natural disaster on the video or images of the insured property (via the one or more local or remote processors) to visually depict whether the insured property is at risk, or has incurred damage, due to the natural disaster and facilitate mitigating or preventive measures that lessen or prevent damage to the insured property caused by the natural disaster.

The mitigating or preventive measure may involve removing personal belongings from the insured property prior to the natural disaster causing damage; adding sandbags around the insured property if the graphic indicates that the insured property is at risk of damage caused by the natural disaster, the natural disaster being a flood or water-related; and/or cutting/removing shrubbery or trees around the insured property if the graphic indicates that the insured property is at risk of damage caused by the natural disaster, the natural disaster being a wild fire or fire-related.

The one or more local or remote processors may be configured to generate insurance-related recommendations for display on the mobile device (or another local or remote computing device) if the graphic indicates that the insured property is at risk of damage caused by the natural disaster, the natural disaster being a flood or wild fire. Additionally or alternatively, the one or more local or remote processors may be configured to adjust insurance premiums or discount based upon the extent of the natural disaster estimated, and/or generate and present one or more insurance-related recommendations if the graphic indicates that the insured property is at risk of damage caused by the natural disaster, the natural disaster being a flood or wild fire. Determining the extent (such as a predicted future or past extent) of the natural disaster at the location of the insured property is based upon computer analysis by the one or more local or remote processors of (i) the video or images taken by the mobile device, (ii) GPS coordinates generated by the mobile device GPS unit, (iii) weather data, including water maps, rain amounts, wind speed and direction, and/or weather forecasts and radar information, and/or (iv) topographical or other map information. The graphic depicting the extent of the natural disaster may be computed by the one or more local or remote processors using various variables, including amount of rainfall based upon the GPS information, continuous duration of rain, and/or groundwater amount.

In another aspect, a computer system or mobile device for presenting a natural disaster simulation on a display may be provided. The computer system or mobile device may include one or more local or remote processors configured to: (1) determine, via the one or more processors (such as a mobile device or remote server processor), an extent of a natural disaster, such as a future or past extent of an ongoing natural disaster at a specific location (such as a GPS location associated with the mobile device and/or images/video acquired by the mobile device); (2) generate a graphic, via the one or more processors, virtually representing the extent of the natural disaster at the specific location; and/or (3) display, via the one or more processors, the graphic on top of still images or video of the specific location taken by the mobile device, the still images or video including images of an insured property, and the graphic depicting whether or not the insured property is at risk of damage due to the natural disaster, or has incurred damage caused by the natural disaster to facilitate taking preventive or mitigating actions and/or providing insurance-related recommendations to an insurance customer via their mobile device.

The one or more processors use the extent of the natural disaster calculated to estimate damage to an insured property, and/or handle or adjust an insurance claim covering the insured property using the estimated damage. The natural disaster may be a flood or wild fire, and the damage to the insured property is water or fire damage.

In another aspect, a computer system or mobile device configured for natural disaster simulation may be provided. The computer system or mobile deice may include one or more local or remote processors configured to: (1) capture current or updated video or images of an insured property via a mobile device camera (and/or the one or more local or remote processors, or other smart cameras), and GPS coordinates from a mobile device GPS unit or nearby GPS units (such as a house smart controller); (2) access a database of one or more historical digital or other images of the insured property, such as one or more historical images stored along with GPS coordinates and/or timestamp information; (3) compare the current or updated video or images of the insured property with the one or more historical digital or other images of the insured property; (4) identify or determine an extent of damage to the insured property caused by the natural disaster, or estimated to be caused by the natural disaster; (5) identify or determine a cost to repair the damage to the insured property and/or an replacement cost for the insured property; and/or (6) display on a mobile device or computing device display the estimated extent of damage to the insured property, and/or the estimated repair or replacement cost for an insured's review and/or approval.

The one or more local or remote processors configured to: prepare a virtual insurance claim (or pre-populate a virtual insurance claim form) for the insured based upon the estimated extent of damage to the insured property, and/or the estimated repair or replacement cost. The one or more local or remote processors may be configured to: adjust or modify an insurance policy, premium, or discount based upon the estimated extent of damage to the insured property, and/or the estimated repair or replacement cost; generate insurance-related recommendations based upon the estimated extent of damage to the insured property, and/or the estimated repair or replacement cost; adjust or modify an insurance policy, premium, or discount based upon an insured following one or more insurance-related recommendations generated; and/or generate a graphic based upon, and/or depicting, the estimated extent of damage to the insured property, and/or displaying the graphic on top of an image of the insured property.

The computer systems and/or mobile devices discussed above may include additional, less, or alternate functionality, including that discussed elsewhere herein. The computer systems and/or mobile devices may be implemented via computer-executable instructions stored on non-transitory computer-readable media or medium.

XIV. Exemplary Computer-Implemented Methods

In one aspect, a computer-implemented method for natural disaster simulation may be provided. The method may include (1) capturing, via one or more local or remote processors (such as mobile device or insurance provider remote server processors), current, more recent, or updated video or images of an insured property via a mobile device camera (and/or the one or more local or remote processors, or other smart cameras), and GPS coordinates from a mobile device GPS unit or nearby GPS units (such as a house smart controller); (2) accessing, via the one or more local or remote processors, a database of one or more historical digital or other images of the insured property stored in a non-transitory memory unit, such as one or more historical images stored along with GPS coordinates and/or timestamp information; (3) comparing, via the one or more local or remote processors, the current or updated video or images of the insured property with the one or more historical digital or other images of the insured property; (4) identifying or determining, via the one or more local or remote processors, an extent of damage to the insured property caused by the natural disaster, or estimated to be caused by the natural disaster; (5) identifying or determining, via the one or more local or remote processors, a cost to repair the damage to the insured property and/or an replacement cost for the insured property; and/or (6) displaying or presenting on a mobile device or computing device display, via the one or more local or remote processors, the estimated extent of damage to the insured property, and/or the estimated repair or replacement cost for an insured's review and/or approval.

The method may include, via the one or more local or remote processors: (i) preparing a virtual insurance claim (or pre-populate a virtual insurance claim form) for the insured based upon the estimated extent of damage to the insured property, and/or the estimated repair or replacement cost; (ii) adjusting or modifying an insurance policy, premium, or discount based upon the estimated extent of damage to the insured property, and/or the estimated repair or replacement cost; (iii) generating insurance-related recommendations based upon the estimated extent of damage to the insured property, and/or the estimated repair or replacement cost; (iv) adjusting or modifying an insurance policy, premium, or discount based upon an insured following one or more insurance-related recommendations generated; and/or (v) generating a graphic based upon, and/or depicting, the estimated extent of damage to the insured property, and/or displaying the graphic on top of an image of the insured property.

In another aspect, a computer-implemented method for natural disaster simulation may be provided. The method may, via one or more local or remote processors (such as mobile device or insurance provider remote server processors), include (1) capturing current, more recent, or updated video or images of an insured property via a mobile device camera (and/or the one or more local or remote processors, or other smart cameras), and GPS coordinates (associated with the insured property) from a mobile device GPS unit or nearby GPS units (such as a house smart controller); (2) accessing a database of one or more historical digital or other images of the insured property stored in a non-transitory memory unit, such as one or more historical images stored along with GPS coordinates and/or timestamp information; (3) comparing, via the one or more local or remote processors, the current or updated video or images of the insured property with the one or more historical digital or other images of the insured property; (4) identifying or determining, via the one or more local or remote processors, an extent of damage to the insured property caused by the natural disaster or other causes (such as age, weather, wear and tear, usage, etc.), or estimated to be caused by the natural disaster other causes (such as age, weather, wear and tear, usage, etc.); (5) identifying or determining, via the one or more local or remote processors, a cost to repair the damage to the insured property for the insured property; and/or (6) displaying or presenting on a mobile device or computing device display, via the one or more local or remote processors, the estimated repair cost for an insured's review and/or approval.

The method may include, via the one or more local or remote processors: (1) preparing a virtual insurance claim (or pre-populate a virtual insurance claim form) for the insured based upon the estimated extent of damage to the insured property, and/or the estimated repair cost; (2) adjusting or modifying an insurance policy, premium, or discount based upon the estimated extent of damage to the insured property, and/or the estimated repair cost; (3) generating insurance-related recommendations based upon the estimated extent of damage to the insured property, and/or the estimated repair cost, such as recommendations related to cut back brush in the case of a wild fire in the vicinity of the insured property; (4) identifying a current type of roofing product, an extent of damage to the current roofing product (e.g., shingle type or manufacturer, or damaged square footage), an replacement type of roofing product, and/or a cost of the replacement type of roofing product; and/or (5) identifying, via the one or more local or remote processors, a current type of house siding product, an extent of damage to the current siding product (e.g., vinyl type or manufacturer, or damaged square footage), an replacement type of siding product, and/or a cost of the replacement type of siding product.

The fore-going methods may include additional, less, or alternate actions, including that discussed elsewhere herein. The methods may be implemented via one or more local or remote processors (such as mobile devices and/or insurance provider remote servers), and/or via computer-executable instructions stored on non-transitory computer-readable media or medium.

XV. Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An enhanced situation visualization (ESV) computing device comprising a memory and at least one processor communicatively coupled to the memory, wherein the at least one processor is programmed to:
   receive a reference request message from a user computing device, the reference request message including an image of a property in a current state;
   retrieve, from a reference database, reference information that includes a historical image of the property in a prior state;
   determine, based upon the reference request message and the reference information, situation information that includes at least one difference between the prior state and the current state of the property;
   generate a virtual grid of the at least one difference between the current state and the prior state;
   generate a reference response message including the situation information, the reference information, and the virtual grid; and
   transmit the reference response message to the user computing device, wherein the reference response message causes the user computing device to display at least one of the situation information and the reference information as overlaid upon a current view of the user to provide an enhanced situation visualization of the property, including displaying the virtual grid over the current view of the property as a virtual grid overlay.

2. The ESV computing device of claim 1, wherein the at least one processor is further programmed to:
   identify an insurance policy associated with the property; and
   transmit the reference response message to an insurance server associated with a provider of the insurance policy.

3. The ESV computing device of claim 2, wherein the at least one processor is further programmed to:
   receive a claims form from the insurance server;
   populate at least one field of the claims form with at least one of the reference information and the situation information; and
   transmit the populated claims form to the insurance server.

4. The ESV computing device of claim 1, wherein the reference request message further includes location information, and wherein the at least one processor is further programmed to identify, using the location information, a location of the user computing device.

5. The ESV computing device of claim 1, wherein the at least one processor is further programmed to:
   identify a beacon associated with the property, wherein the beacon is coupled to an item of interest associated with the property;
   transmit an interrogation signal to the beacon;
   determine a location of the beacon relative to the user computing device; and
   transmit the location of the beacon relative to the user computing device in the reference response message for display on the user computing device as an icon including an item tag, a direction indicator, and a distance indicator.

6. The ESV computing device of claim 1, wherein the at least one processor is further programmed to:
   determine an object associated with a public utility;
   determine a current state of the object; and
   transmit an indicator of the current state of the object in the reference response message for display on the user computing device as an icon.

7. A computer-based method for generating and displaying an enhanced situation visualization (ESV) on a user interface of a user computing device, said method comprising:
   receiving, by an ESV computing device, a reference request message from the user computing device, the reference request message including an image of a property in a current state;
   retrieving, from a reference database, reference information that includes a historical image of the property in a prior state;
   determining, based upon the reference request message and the reference information, situation information that includes at least one difference between the prior state and the current state of the property;
   generating a virtual grid of the at least one difference between the current state and the prior state;
   generating a reference response message including the situation information, the reference information, and the virtual grid; and
   transmitting the reference response message to the user computing device, wherein the reference response message causes the user computing device to display at least one of the situation information and the reference information as overlaid upon a current view of the user to provide an enhanced situation visualization of the property, including displaying the virtual grid over the current view of the property as a virtual grid overlay.

8. The computer-based method of claim 7 further comprising:
   identifying an insurance policy associated with the property; and
   transmitting the reference response message to an insurance server associated with a provider of the insurance policy.

9. The computer-based method of claim 8 further comprising:
   receiving a claims form from the insurance server;
   populating at least one field of the claims form with at least one of the reference information and the situation information; and
   transmitting the populated claims form to the insurance server.

10. The computer-based method of claim 7, wherein the reference request message further includes location information.

11. The computer-based method of claim 7 further comprising:
    identifying a beacon associated with the property, wherein the beacon is coupled to an item of interest associated with the property;
    transmitting an interrogation signal to the beacon;
    determining a location of the beacon relative to the user computing device; and
    transmitting the location of the beacon relative to the user computing device in the reference response message for display on the user computing device as an icon including an item tag, a direction indicator, and a distance indicator.

12. The computer-based method of claim 7 further comprising:
    determining an object associated with a public utility;
    determining a current state of the object; and
    transmitting an indicator of the current state of the object in the reference response message for display on the user computing device as an icon.

13. One or more non-transitory computer-readable storage media having computer-executable instructions embodied thereon, wherein when executed by at least one processor, the computer-executable instructions cause the processor to:
    receive a reference request message from a user computing device, the reference request message including an image of a property in a current state;
    retrieve, from a reference database, reference information that includes a historical image of the property in a prior state;
    determine, based upon the reference request message and the reference information, situation information that includes at least one difference between the prior state and the current state of the property;
    generate a virtual grid of the at least one difference between the current state and the prior state;
    generate a reference response message including the situation information, the reference information, and the virtual grid; and
    transmit the reference response message to the user computing device, wherein the reference response message causes the user computing device to display at least one of the situation information and the reference information as overlaid upon a current view of the user to provide an enhanced situation visualization of the property, including displaying the virtual grid over the current view of the property as a virtual grid overlay.

14. The computer-readable storage media of claim 13, wherein the computer-executable instructions further cause the processor to:
    identify an insurance policy associated with the property; and
    transmit the reference response message to an insurance server associated with a provider of the insurance policy.

15. The computer-readable storage media of claim 14, wherein the computer-executable instructions further cause the processor to:
    receive a claims form from the insurance server;
    populate at least one field of the claims form with at least one of the reference information and the situation information; and transmit the populated claims form to the insurance server.

16. The computer-readable storage media of claim 13, wherein the reference request message further includes location information, and wherein the computer-executable instructions further cause the processor to identify, using the location information, a location of the user computing device.

17. The computer-readable storage media of claim 13, wherein the computer-executable instructions further cause the processor to:
   identify a beacon associated with the property, wherein the beacon is coupled to an item of interest associated with the property;
   transmit an interrogation signal to the beacon;
   determine a location of the beacon relative to the user computing device; and
   transmit the location of the beacon relative to the user computing device in the reference response message for display on the user computing device as an icon including an item tag, a direction indicator, and a distance indicator.

\* \* \* \* \*